United States Patent [19]

Katano et al.

[11] Patent Number: 5,278,126
[45] Date of Patent: Jan. 11, 1994

[54] RECORDING PROCESS AND APPARATUS AND RECORDING MEDIUM IN THE SAME

[75] Inventors: Yasuo Katano, Yokohama; Tsutomu Nakajima; Yoshikazu Kaneko, both of Numazu; Hiroyuki Horiguchi, Yokohama, all of Japan

[73] Assignee: Ricoh Company, Ltd., Tokyo, Japan

[21] Appl. No.: 620,579

[22] Filed: Dec. 3, 1990

Related U.S. Application Data

[63] Continuation-in-part of Ser. No. 501,871, Mar. 29, 1990, abandoned.

[30] Foreign Application Priority Data

| Mar. 31, 1989 [JP] | Japan | 1-81181 |
| Sep. 6, 1989 [JP] | Japan | 1-232019 |
| Feb. 23, 1990 [JP] | Japan | 2-43599 |
| Aug. 8, 1990 [JP] | Japan | 2-209398 |

[51] Int. Cl.$^5$ ............................................... B41M 5/124
[52] U.S. Cl. ......................................... 503/201; 428/195; 503/227
[58] Field of Search ............... 428/195, 913; 346/135.1; 503/201

[56] References Cited

U.S. PATENT DOCUMENTS

| 3,868,651 | 2/1975 | Ovshinsky | 340/173 LS |
| 4,838,940 | 6/1989 | Kan et al. | 106/22 |
| 4,920,361 | 4/1990 | Arahara et al. | 346/140 R |
| 4,962,389 | 10/1990 | Kan et al. | 346/140 R |

FOREIGN PATENT DOCUMENTS

| 15-18992 | 8/1940 | Japan | 428/195 |
| 15-18993 | 8/1940 | Japan | 428/195 |
| 44-9512 | 5/1969 | Japan | 428/195 |
| 54-41902 | 12/1979 | Japan | 428/195 |
| 63-264392 | 11/1988 | Japan | 428/195 |

OTHER PUBLICATIONS

Japanese Journal of Polymer Science and Technology, vol. 37, No. 4, pp. 287-291, Apr. 1980, N. Negishi, et al., (with English Abstract).
Derwent Abstract 30349U-L.

*Primary Examiner*—B. Hamilton Hess
*Attorney, Agent, or Firm*—Oblon, Spivak, McClelland, Maier & Neustadt

[57] ABSTRACT

A recording process includes in an arbitrary order steps of bringing a contact material into contact with a surface of a recording medium, and selectively heating the surface of the recording medium. The surface of the recording medium has a characteristic which a receding contact angle becomes smaller when the recording medium is brought into contact with liquid and it is in the heated status. The contact material is selected from a liquid, a vapor or a liquid under conditions of a temperature lower than a temperature at which the receding contact angle of the recording medium starts to decrease. An area having the receding contact angle corresponding to a temperature of the recording medium obtained by selectively heating the surface of the recording medium in accordance with image information in formed, as latent image, on the surface of the recording medium.

42 Claims, 16 Drawing Sheets

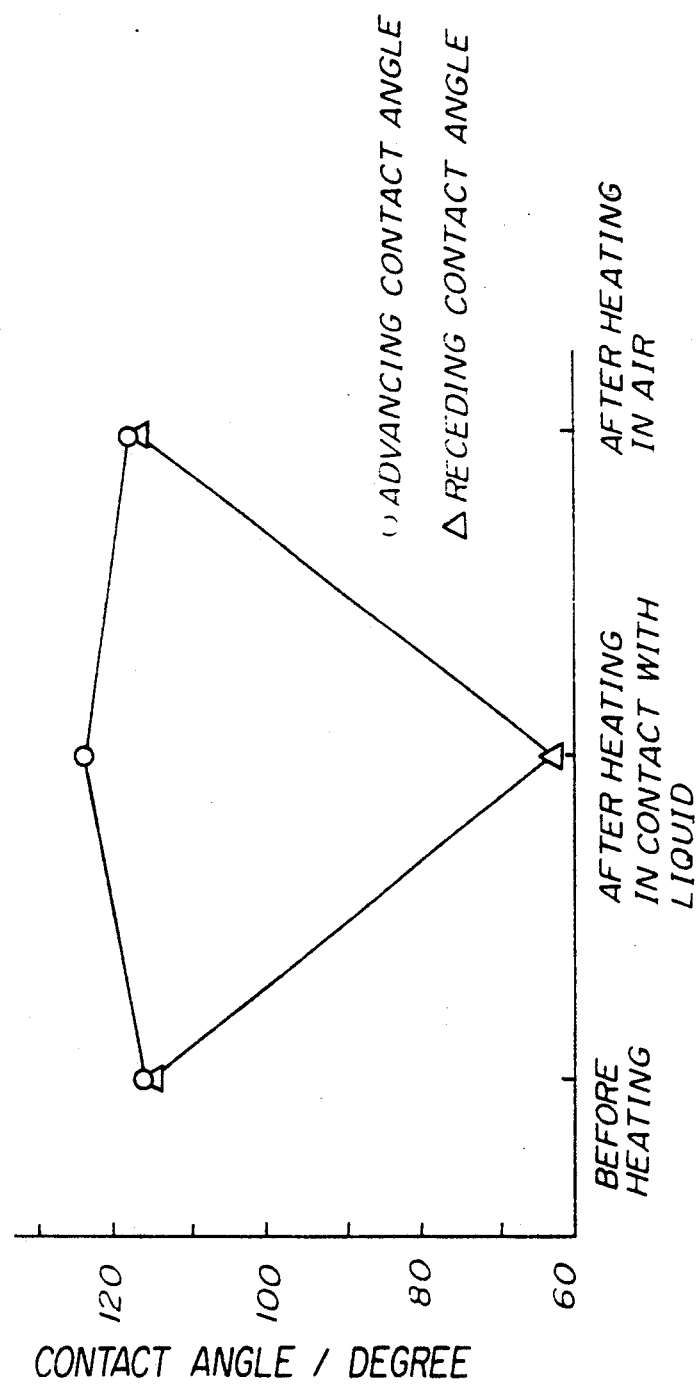

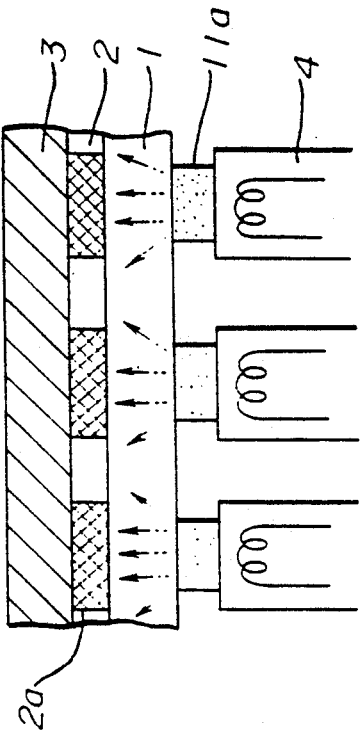
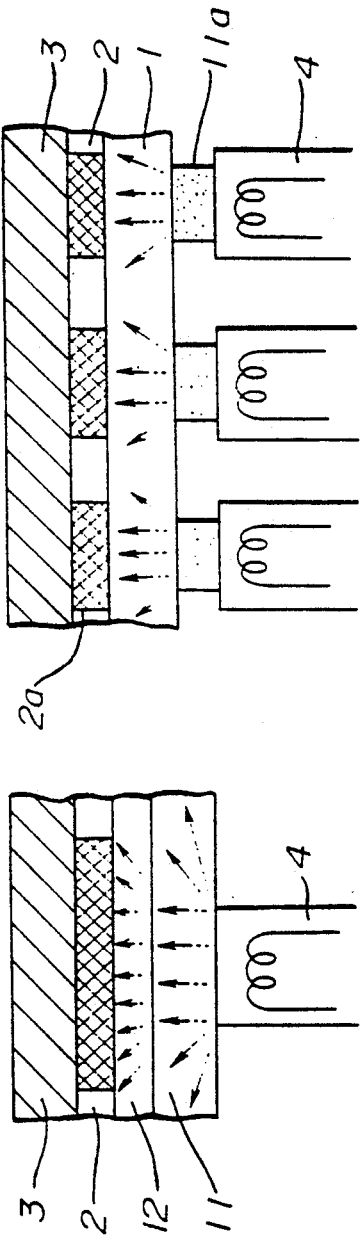

RECORDING PROCESS AND APPARATUS AND RECORDING MEDIUM IN THE SAME

CROSS-REFERENCE TO RELATED APPLICATIONS

This application is a continuation-in-part of application Ser. No. 501,871 filed Mar. 29, 1990, now abandoned for RECORDING PROCESS.

BACKGROUND OF THE INVENTION

1. Field of the Invention

The present invention relates to a novel recording process and apparatus, and a recording medium in the same, and more particularly to a recording process and apparatus, and a recording medium in the same in which an area indicating a receding contact angle corresponding to a heating temperature is formed selectively or selectively and reversibly on a surface of a recording medium for which the surface exhibits specific properties, and moreover, relates to a recording method in which that area is supplied with a recording agent that includes a colorant for image appearance.

2. Description of the prior art

Offset printing method using printing plates without water (water for moisturizing) is a typical recording medium is divided into areas that have a liquid adhering to them, and areas that do not have a liquid adhering to them. However, in this offset printing method, it is difficult to incorporate all of the processes including the process for the manufacturing of the original plates and the printing processes from the plates (printing plates) into a single apparatus. This makes it difficult to have a compact printing plate apparatus.

For example, even in the case of relatively compact offset printing apparatus and the printing apparatus to be separate.

For the purpose of eliminating this fault of the offset printing method, there has been proposed a recording method and apparatus in which areas for liquid deposition and areas for no liquid deposition have been formed on a recording medium in accordance with image information and also in which the repeated usage of that recording medium is possible (i.e. the process is reversible). The following are some of these.

① Water-soluble developing method

After a charge has been externally applied to an hydrophobic photo-electric layer, the medium is exposed and the surface of the photo-electric layer has formed upon it a pattern having both a hydrophobic portion and a hydrophilic portion. A water soluble developing solution adheres to only the hydrophilic portion and is transferred to a paper or the like. (Such methods and apparatus are disclosed in Japanese Patent Publication No. 40-18992, Japanese Patent Publication No. 40-18993, Japanese Patent Publication No. 44-9512, Japanese Patent Laid Open Publication No. 63-264392, etc.)

② Method using the photo-chemical response of a photo-chromic material

In this method, ultraviolet light is irradiated to a layer that contains a material such as a spiropyran or an azo dye so that a photo-chemical reaction occurs to make the photo-chromatic substances hydrophilic and the like. (Such methods and apparatus is described in "Japanese Journal of Polymer Science and Technology" Vol. 37, No. 4 page 287 (1980).)

③ Method using the action of an internal biasing forces

This is a method whereby the portions where a liquid ink adheres or does not adhere are formed by the physical transformation of an amorphous substance and a crystalline substance on the recording medium. (An example of such is disclosed in Japanese Patent Laid Open Publication No. 54-41902.)

According to the previously described method ①, after the water-soluble ink is transferred to the paper or the like, the hydrophilic portion is removed by removing the charge so that is possible to record other image information. This is to say that the one original plate (photo-electric body) can enable repeated printing. However, this method uses an electron transfer process as its basis and so requires a long process involving charging→exposing →developing→transfer→discharging so that there are accompanying problems with making the apparatus compact, in reducing its cost and in maintaining it.

With the method ② described above, it is possible to freely control the reversibility of the hydrophilic and hydrophobic properties by selective irradiation of ultraviolet and visible light. However, since the quantum efficiency is very small, the response time is extremely long and the recording speed is slow. In addition, there is also the fault of image instability. This method has still not reached the level of practical application.

Furthermore, with the method ③ described above, the information recording member (the recording medium) that is used has stability after the recording has been performed but there are occasions that structural transformation occurs in the image recording member due to temperature changes prior to the recording. This is to say that the removal of the recorded information pattern needs a machine that applies a thermal pulse followed by rapid cooling so that is is difficult to perform frequent repetition of image formation.

SUMMARY OF THE INVENTION

Accordingly, a general object of the present invention is to provide a novel and useful recording method in which the disadvantages of the aforementioned prior art are eliminated.

Another more specific object of the present invention is to provide a recording process for selectively, or for selectively and reversibly forming a predetermined pattern area using a simple process, on the surface of a recording medium having a surface for which the receding contact angle becomes lower when a heated liquid is brought into contact with it.

Another object of the present invention is to provide a method by which a recording agent (liquid ink etc.) including a colorant can be supplied to a predetermined pattern area on a recording medium so that a favorable developed image can be obtained. This visible image can be fixed on the surface of the recording medium. The visible image can also be transferred to a transfer medium such as plain paper and the like, and can be fixed on the surface of the transfer medium. Also provided is a recording method in which a clear image having gradations is obtained.

In addition to the objectives described above, another objective of the present invention is to provide a novel recording process that in all of the processes for the formation and erasure of a predetermined pattern area, the developing of the latent image and the transfer and the like, reversibly performs these processes for a plural number of times, by using a recording medium that has excellent permanence and stability.

The recording process relating to the present invention has steps for selectively heating a surface of a recording medium (A) described below and a contact material (B) when the two are in a contacted status, so that in the status where the recording medium (A) is selectively heated, the contacting of the contact material (B) causes the formation of an area exhibiting a receding contact angle corresponding to a heating temperature on the surface of the recording medium (A) (and which is a predetermined pattern area, hereinafter for the sake of convenience, termed either a "latent image" or a "latent image area").

(a) A recording medium having a surface wherein the receding contact angle is lowered when in the heated status and a liquid is in contact.

(b) A liquid, a vapor, or a solid that generates or changes to a liquid or a vapor at a temperature lower than a temperature at which the receding contact angle of the recording medium (A) starts to decrease.

On the other hand, another object of the present invention is to provide to a recording medium which is used in the recording process described above and to provide to a recording apparatus which operates in accordance with the recording process.

The object of the present invention is achieved by a recording medium comprising a base member and a recording layer, provided on the base member, having a characteristic in which a receding contact angle decreases when the recording layer is heated in a condition where the recording layer is in contact with a liquid, the recording layer has an organic compound which includes a hydrophobic group, the hydrophobic group having a nature whereby it is, oriented to a side open to air when the recording layer is heated in air.

The object of the present invention is also achieved by a recording apparatus comprising a recording medium having a recording member having a characteristic in which a receding contact angle decreases when the recording member is heated in a condition where the recording member is in contact with a liquid, first heating means, coupled to the recording medium, for selectively heating the recording member in accordance with image information, and first supplying means, coupled to the recording medium, for supplying a contact material to a surface of the recording member, the contact material being selected from a liquid, a vapor and a solid which generates or changes to either a vapor or liquid under conditions of a temperature lower than a temperature at which the receding contact angle on the recording member starts to decrease, wherein the receding contact angle on an area on the surface of the recording member, where the contact material is supplied and the first heating means heats, decreases so that a latent image corresponding to the area is formed on the surface of the recording member.

The above object of the present invention is also achieved by a recording apparatus comprising a recording medium having a base member and a recording member which is supported by the base member, the recording member having a characteristic in which a receding contact angle decreases when the recording member is heated in a condition where the recording member is in contact with a liquid, first heating means, coupled to the recording medium, for selectively heating the recording member in accordance with image information, and supplying means, coupled to the recording medium, for supplying a recording agent which includes a colorant to a surface of the recording member, wherein the receding contact angle on an area on the surface of the recording member, where the recording agent is supplied and the first heating means heats, decreases so that the recording agent adheres on the area and visible image corresponding to the area is formed on the surface of the recording member.

The process relating to the present invention supplies a recording agent that includes a colorant, to the latent image area and develops a latent image. In addition, instead of the contact material (B), the recording agent that includes a colorant can be used to form a latent image and develop it at the same time.

In the status where the contact material (B) has been removed, the method relating to the present invention performs the erasure of the latent image by heating the surface of the recording medium where the latent image has been formed.

The inventors of the present invention performed much research and investigation regarding a novel recording method in which the faults described for the conventional technologies have been eliminated. As a result of this, the inventors discovered that a member having a surface having a function in which the receding contact angle becomes smaller after heating and cooling in the status where it is in contact with a liquid, and in which the receding contact angle becomes larger by heating in a status where the liquid has been removed, is effective as a recording medium. Then, the surface of the recording medium (A) having this function (1) is a member that includes an organic compound having a surface self orientation function with a hydrophobic group, and or (2) is a member that is an organic compound having a surface self orientation function with a hydrophobic group and which has a hydrophobic group oriented to the surface.

The (1) "surface self orientation function" refers to an orientation whereby the hydrophobic group at the surface is oriented towards the side of the air (i.e. the side with the free surface) when a solid that has a compound formed on a supporting body, or a solid formed by a compound itself is heated in air. This also refers to (2). In general, organic substances display the phenomena whereby a hydophobic group is easily oriented towards the side of a hydrophobic atmosphere. This is a phenomena that occurs when the orientation is towards the side whereby the interfacial energy of the solid-gas boundary becomes lower. In addition, this phenomena is remarkable for the longer the molecular chains of the hydrophobic group. This is because when the molecules are heated, those which have longer molecular chains have larger mobilities.

More specifically, in the case of a molecule that has a hydrophobic group at its end (i.e. a molecule in which the surface energy is low), is more easily oriented in the direction of the side of the air (i.e. the side with the free surface). In the same manner, in the case of chain molecules that include $(CH_2)_n$, the $(CH_2CH_2)$ bond is a flat and is easily oriented. In addition, molecules that include

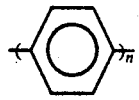

have a flat structure for the

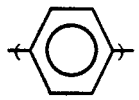

portion, and are easily oriented. Especially, the chain molecules including a chemical element in which an electronegativity is large, such as a fluoride, have a large self aggregation. In the chain molecules, a mutual molecular chains are easily oriented.

To summarize the results of this investigation, it is more desirable to have a chain molecule that includes a molecule having a flat structure or a self aggregation, and which also is a chain molecule having a hydrophobic group at its ends, or a compound that includes such chain molecules as these are compounds that have a high self-orientation function.

As is clear from the preceding discussion, there is a relationship between the surface self-orientation status and the receding contact angle. In addition, there is also a relationship between the receding contact angle and the liquid adhesiveness. This is to say that the adhesion of the liquid to the surface of the solid is mainly created by tacking by the liquid at the surface of the solid. This tacking can be regarded as a type of friction when the liquid slides against the surface of the solid. Accordingly, in this invention, when the friction force is $\gamma f$, then the "receding contact angle" $\theta r$ can be determined as follows:

$$\cos\theta r = \frac{\gamma}{\gamma 1 V}(\gamma s \gamma s_1 - \pi e + \gamma f)$$

Where:
$\gamma$ roughness factor
$\gamma s$ surface tension of solid in vacuum
$\gamma s_1$ interfacial tension at the solid-liquid interface
$\gamma 1 V$ surface tension of the liquid in equilibrium with its saturated vapor
$\pi e$ equilibrium surface pressure
$\gamma f$ frictional tension
(Saito, Hokuzaki et. al: "Japan Contact Adhesive Association Magazine" Vol. 22, No. 12, No. 1986)

Accordingly, when the value of $\theta r$ becomes lower, the value of $\gamma f$ becomes greater. This is to say that the liquid slides less easily over the surface of the solid.

As can be assumed from this mutual relationship, the adhesiveness of the liquid depends on the receding contact angle $\theta r$. This receding contact angle $\theta r$ is determined by the material having a surface with a surface self-orientation function.

In the method of the present invention, the recording medium (A) requires the developing of a latent image on the surface by the formation of a predetermined pattern area and/or a recording agent and so the recording medium (A) must be a material for which the surface self-orientation function is selective.

BRIEF DESCRIPTION OF THE DRAWINGS

FIG. 4 is a view indicating the changes in the advancing contact angle and the receding contact angle in the surface of the recording medium.

FIGS. 6A through 14B are views describing embodiments of an apparatus that performs image formation in accordance with the image recording process of the present invention.

DETAILED DESCRIPTION OF THE PREFERRED EMBODIMENTS

A recording medium (A) used in the recording method of the present invention is, as described above, one that has a surface for which the receding contact angle $\theta r$ becomes smaller when the recording medium is heated and comes into contact with a liquid.

This recording medium (A) can be of any shape as long as its surface is of the nature described above. Accordingly, the recording medium (A) can be of a film shape. The recording medium (A) can also have a structure whereby a coating film or the like having the nature described above, is provided on the surface of a supporting body or a formed body. The recording medium (A) can also be the formation body itself. In any case, it is necessary that the surface of the formation body image have the nature that is described above.

Whether or not the liquid adhesion portion in the latent image area of the recording medium (A) is a lipophilic or a hydrophilic one is dependent upon the type of the contact material (B). Accordingly, the use of oil-soluble ink or water-soluble ink is determined in accordance with necessity when the object to which the image is to be transferred is obtained.

Figure 1A:
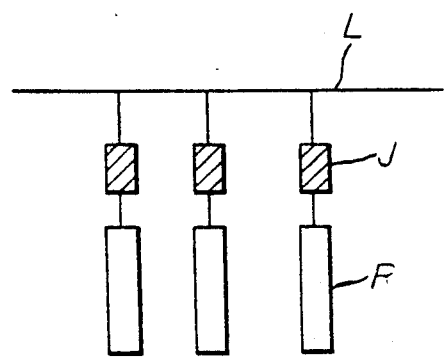
FIG. 1A through 1D are views indicating a model of the structure of a material having a surface self-orientation function.

Here, FIG. 1A through 1D indicate a classification of the types of materials or portions of materials "having a surface for which the receding contact angle $\theta r$ decreases when that material is heated and brought into contact with a liquid." FIG. 1A indicates an example of a compound having a self-orientation function. This compound has a hydrophobic group on the side chains of the macromolecule polymer. The main chain L and the hydrophobic group R are linked by the linking group J.

Figure 1B:
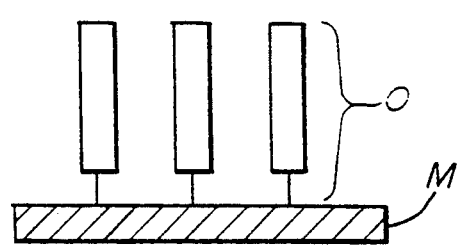
Figure 1C:
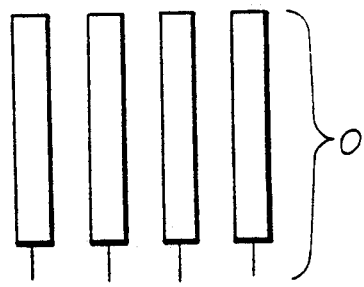

FIG. 1B indicates an example of a material in which the hydrophobic group in an organic compound are oriented towards the surface. The compound O having the previously described hydrophobic group is formed by the physical or chemical linking to the surface of an organic or inorganic surface M. FIG. 1C shows an example of a material that is made up of only the organic compound O having the hydrophobic group indicated in FIG. 1B.

Figure 1D:
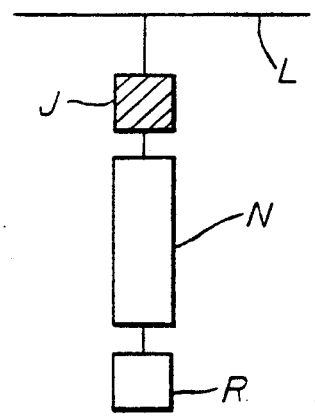

FIG. 1D indicates and example where the chain molecules are in a side chain of a macromolecule. The chain molecules and the main chain L are linked by the linking chain J. This is a compound that has hydrophobic functional groups at its ends and a molecular chain N that has either a flat structure or a self-aggregation in the middle.

In the examples shown in FIGS. 1A and 1D, the main chain L of the macromolecule compound can either have a linear shape or a network structure.

In the example indicated in FIG. 1B, as in the case of a deposited Langmuir-Blodgett film, it is also possible to use a compound O including a hydrophobic group and then deposit a compound O including a hydrophobic group on the substrate. In the example indicated in FIG. 1C, there is only a compound including a hydrophobic group, with there being no main chain L and no linking to an organic or inorganic material (M) or the like.

The previously described hydrophobic group should desirably have the end molecules as $-CH_3$ and $-CF_3$, $-CF_2H$, $-CFH_2$, $-C(CF_3)_3$, $-C(CH_3)_3$ or the like. More desirably however, it is advantageous if this hydrophobic group has long molecules that have a high molecular mobility. Of these, the previously described hydrophobic group can be a substituted alkyl (such as one having

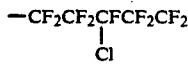

or the like) which has more than one $-F$ and/or $-Cl$, or a non-substitution alkyl group that has a carbon number of 4 or more. An alkyl group in which either a fluorine or a chlorine is substitutied for at least one hydrogen thereof can be used and it is more effective if an alkyl group in which a fluorine is substituted for at least one hydrogen thereof is used. It is further more effective that a compaund has the polymer whose side chain includes fluorine.

The principle of this functioning is not yet fully understood but is assumed to be as described below.

First of all it will be considered that the surface of a recording medium (A) formed by this compound described above, and in which the surface has the previously described hydrophobic group is considerably oriented. Accordingly, this surface has a liquid repellency property (since the surface energy of the hydrophobic is the smaller). In this status, when the surface of the recording medium (A) and the surface of the contact material (B) are brought into contact and heated, the heating causes the molecular motion of the hydrophobic group to increase. In addition, by interaction with the contact material (B), the surface of the recording medium (A) changes so that the orientation status of at least one portion of it moves to a different status. (This is to say that there is either a different orientation status or the status whereby the orientation is disturbed.) After cooling, it is assumed that this status is maintained. Even if the contact material (B) is either a vapor or a solid before heating, the contact material (B) in contact with the recording medium (A) becomes liquid in the status in which the recording medium (A) is being heated.

Prior to heating, because the hydrophobic group is oriented in the surface of the recording medium (A), the surface energy of the recording medium (A) is extremely low.

However, by heating the recording medium (A) in the status where the contact material (B) is in contact with it, the orientation status is disturbed and the surface energy is increased. The receding contact angle $\theta r$ is determined by the balance between the surface energy of the solid and the surface energy of liquid. If surface energy of the solid is high, then irrespective of the type of liquid, the receding contact angle $\theta r$ will become smaller. Accordingly, the adhesiveness with respect to the liquid will increase as a result.

Furthermore, when the surface of the recording medium (A) is in a different status, (either a status where there is an orientation different from the former orientation status or a status where the orientation has been disturbed), and when there is also the status where is no contact material (B) and the recording medium (A) is heated, then interaction with the contact material (B) will not occur and so it is thought that the material reverts to the former orientation status.

Accordingly, the contact material (B) is not one where it simply performs cooling after the surface of the recording medium (A) has been heated, but is one where there is some kind of interaction with the compound of the surface of the recording medium (A) for the change of status (either a status where there is an orientation different from the former orientation status or a status where the orientation has been disturbed) to occur.

As has been described, when the hydrophobic group of the member (compound) forming the surface of the recording medium (A) is an alkyl, an alkyl group in which either a fluorine or a chlorine is substituted for at least one hydrogen thereof, then it is necessary for the carbon number of the alkyl to be 4 or more. This carbon number which is 4 or more is through to be the necessary number for active molecular motion when heating is performed, and for a certain degree of orientation of the alkyl on the surface of the recording medium (A). In addition, when the contact material (B) is heated along with the surface of the recording medium (A), it is thought that the molecules of the contact material (B) are incorporated into the molecules of the surface of the recording medium (A). Furthermore, an alkyl including fluorine or chlorine which has a high electronegativity is used, then there is a large interaction action with liquid and particularly liquids having polarity and so there is a larger change in the adhesiveness than in the case of a compound that includes an non-substituted alkyl. In addition, alkyl functional groups that include fluorine have a strong self-aggregation and so the surface self-orientation function is also high. Still furthermore, alkyl functional groups that include fluorine have a low surface energy and so have an excellent effect in prevention the surface of the recording medium from being dirtied.

Moreover, the surface of the recording medium (A) has a liquid repellency effect. This maybe described in terms of the surface energy of a solid. In the course of the investigation performed by the inventors, it was found that it is desirable as far as use for a recording method is concerned, for this surface energy to be 50 dyn/cm or less. Values higher than this makes the surface of the recording medium (A) not and dirty with the recording agent.

The following will be a detailed description of a compound forming the surface of the recording medium (A). The first group that will be considered is that for a compound having an alkyl group (including fluorine, chlorine) in the side chains of a polymer. More specifically, the monomers indicated in (I), (II), (III), (IV), (V), (VI) and (VII) are preffered.

$$\begin{array}{c} CH_2=CR \\ | \\ COORf \end{array} \quad (I)$$

R is either —H, —CH$_3$, —C$_2$H$_5$, —CF$_3$ or —C$_2$F$_5$, and desirably determined as either —H or —CH$_3$.

Rf is either alkyl having a carbon number of 4 or more, a group including an alkyl group in which either a fluorine or a chlorine is substituted for at least one hydrogen thereof, or a hydrohobic group with (CF$_2$)$_i$, (CH$_2$)$_i$, or

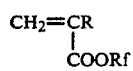

(where $i \geq 4$). Morer concretely, Rf is either (CH$_2$)nR$^3$, —CH$_2$CF$_2$CHFCF$_3$, or $$-CH_2CH(OH)CH_2CO- \quad \overset{O}{\underset{||}{}} \quad -OC(CF_3)=C\overset{CF(CF_3)_2}{\underset{CF(CF_3)_2.}{}}$$

In (CH$_2$)nR$^3$, n is an integer in a range between 1 and 10, and R$^3$ is linear chain or branching perfluoroalkyl group in which the carbon number is between 3 and 21. Other examples of Rf are listed as follows. —CH(CF$_3$)$_2$, —CF(CF$_3$)$_2$, $$-CH_2CH_2O\overset{O}{\underset{||}{C}}R^4$$

(where R$^4$ is linear chain or branching perfluoroalkyl group in which the carbon number is between 3 and 20), $$-CH_2CH_2N\overset{\overset{O}{||}}{\underset{\underset{C(CH_3)_3}{|}}{C}}(CF_2)_7CF(CF_3)_2, \text{ and } CH_2\overset{|}{\underset{OH}{C}}HCH_2R^5$$

(where R$^5$ is linear chain or branching perfluoroalkyl group in which the carbon number is between 1 and 8 or —CH[CH$_2$OCF(CF$_3$)$_2$]$_2$)

$$\begin{array}{c} CH_2=CR \\ | \\ OCORf \end{array} \quad (II)$$

R is either —H, —CH$_3$, C$_2$H$_5$, —CF$_3$ or —C$_2$F$_5$, and desirably determined as either —H or —CH$_3$.

Rf is either alkyl having a carbon number of 4 or more, a group including an alkyl group in which either a fluorine or chlorine is substituted for at least one hydrogen thereof, or a hydrohobic group with (CF$_2$)$_i$, (CH$_2$)$_i$, or

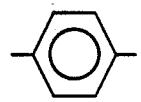

(where $i \geq 4$). More concretely, Rf is either —(CH$_2$)$_n$R$^7$ (where n is an integer in a range between 1 and 10, and R$^7$ is linear chain or branching perfluoroalkyl group in which the carbon number is between 3 and 21.) or —R$^8$N(R$^9$)SO$_2$R$^{10}$ (where R$^8$ is alkylene group in which the carbon number is between 1 and 12, R$^9$ is hydrogen or linear chain or branching alkyl group in which the carbon number is between 1 and 6, and R$^{10}$ is linear chain or branching perfluoroalkyl group in which the carbon number is between 4 and 12).

Another example of Rf is —(CF$_2$)$_n$F, where n is an integer in a range between 3 and 17.

$$\begin{array}{c} CH_2=CR \\ | \\ O=C-Rf \end{array} \quad (III)$$

R is either —H, —CH$_3$, —C$_2$H$_5$, —CF$_3$ or —C$_2$F$_5$, and desirably determined as either —H or —CH$_3$.

Rf is either alkyl having a carbon number of 4 or morer, a group including an alkyl group in which either a fluorine or a chlorine is substituted for at least one hydrogen thereof, or hydrohobic group with (CF$_2$)$_i$, (CH$_2$)$_i$, or

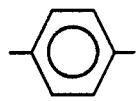

(where $i \geq 4$). More concretely, Rf is either

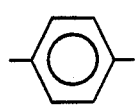

or —SCH₂CH₂R¹² (where R¹² is linear chain or branching perfluoroalkyl group in which the carbon number is between 5 and 13 or —CH₂F).

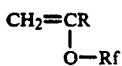 (IV)

R is either —H, —CH₃, —C₂H₅, CF₃ or —C₂F₅, and desirably determined as either —H or —CH₃.

Rf is either alkyl having a carbon number of 4 or more, a group including an alkyl group in which either a fluorine or a chlorine is substituted for at least one hydrogen thereof, or a hydrohobic group with $(CF_2)_i$, $(CH_2)_i$, or

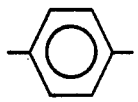

(where $i \geqq 4$). More concretely, an example of Rf is

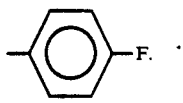

Other examples of Rf are listed as follows:

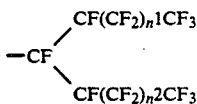

where both $n^1$ and $n^2$ are integers in a range between 0 and 10, —CF[CF(CF₃)₂]₂,

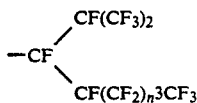

where both $n^3$ is an integer in a range between 0 and 18,

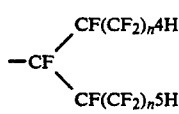

where both $n^4$ and $n^5$ are integers in a range between 1 and 18,

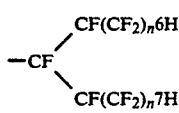

where both $n^6$ and $n^7$ are integers in a range between 1 and 18, or

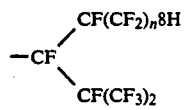

where $n^8$ is an integer in a range between 1 and 18.

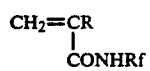 (V)

R is either —H, —CH₃, —C₂H₅, CF₃ or —C₂F₅, and desirably determined as either —H or —CH₃.

Rf is either alkyl having a carbon number of 4 or more, a group including an alkyl group in which either a fluorine or a chlorine is substituted for at least one hydrogen thereof, or a hydrohobic group with $(CF_2)_i$, $(CH_2)_i$, or

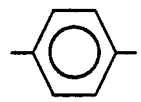

(where $i \geqq 4$). More concretely, an example of Rf is —(CH₂)₃CF₃.

Other examples of Rf are listed as follows: —CH₂CF₂, —CH₂CF₂CH₃, CHCF₃.

 (VI)

 (VII)

In (VI) and (VII),

R: hydrogen, CH₃, C₂H₅, CF₃ or C₂F₅

Rf: alkyl having a carbon number of 4 or more, or a group including an alkyl group in which either a fluorine or a chlorine is substituted for at least one hydrogen thereof, or a hydrophobic group with

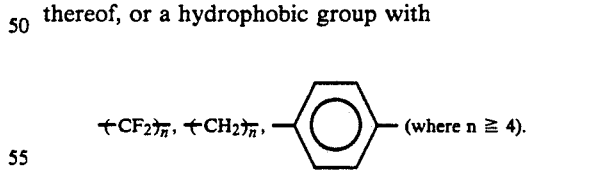

n': integer of 1 or more

Other polymers are those indicated in (VIII), (IX) and (X).

 (VIII)

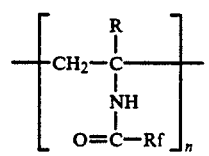

(IX)

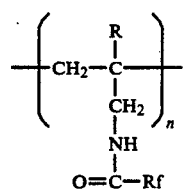

(X)

R: —H, CH$_3$, —C$_2$H$_5$, —CF$_3$ or —C$_2$H$_5$

Rf: alkyl group having a carbon number of 4 or more, or a group including an alkyl group in which either a fluorine or a chlorine substituted for at least one hydrogen thereof, or a hydrophobic group with

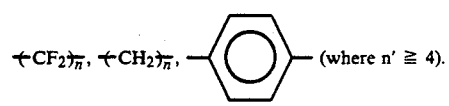 (where n' ≥ 4).

n: integer of 10 or more

In these (I) through (X), Rf can be as indicated in to the following (1) through (20).

—CH$_2$CF$_2$CHFCF$_3$ (1)

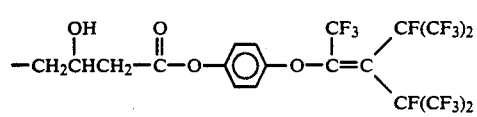 (2)

—CH$_2$CH$_2$OC—C$_7$F$_{15}$
        ‖
        O (3)

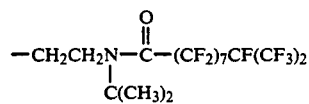 (4)

—CH$_2$CHCH$_2$(CF$_2$)$_4$CF$_3$ (5)
   |
   OH

—CH$_2$(CF$_2$)$_{10}$H (6)

$\f{CF_2\}_6$O—CF$_2$CF$_3$ (7)

$\f{CH_2\}_4$NH—CF$_2$CF$_3$ (8)

$\f{CF_2\}_6$CF$_3$ (9)

$\f{CH_2\}_{10}$C$_8$F$_{17}$ (10)

—CH$_2$N—SO$_2$C$_8$F$_{17}$ (11)
   |
   C$_2$H$_5$ $\f{CH_2\}_{10}$NSO$_2$C$_8$F$_{17}$ (12)
   |
   CH$_3$

—CH$_2$NHSO$_2$C$_8$F$_{17}$ (13)

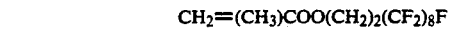 (14)

-s-CH$_2$CH$_2$—(CF$_3$)$_6$CF(CF$_3$)$_2$ (15)
—CH$_2$CF$_2$CF$_2$CF$_3$ (16)
—CH$_2$CH$_2$CH$_2$CH$_2$F (17)
—CH$_2$(CF$_2$)$_6$CF$_3$ (18)
—CH$_2$(CF$_2$)$_5$CF$_3$ (19)
$\f{CH_2\}_3$CF$_3$ (20)

A recording layer is formed on a base member so that the recording medium is formed. A description will now be given of (1) the base member, (2) the recording medium and (3) the recording layer forming process.

(1) The base member:

The base member can be a resin film such as a polyester film, glass plate, a metallic plate or the like.

(2) The recording layer:

The recording layer is formed on a polymer (copolymer). The monomer forming the polymer is not limited to the known compound, and thus various types can be considered. Materials indicated by general formulas (I) through (X) described above are desirable for the recording layer.

Examples of the materials indicated by the general formula (I) are either acrylate or methacrylate including the following perfluoroaklyl group.

CH$_2$=CHOO(CH$_2$)$_2$(CF$_2$)$_8$F,

CH$_2$=C(CH$_3$)COOCH$_2$(CF$_2$)$_4$CF$_3$

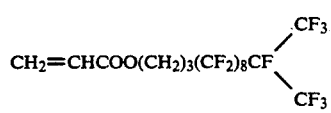

CH$_2$=C(CH$_3$)COO(CH$_2$)$_2$(CF$_2$)$_6$CF$_3$

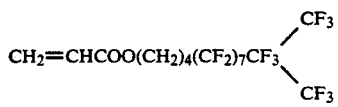

CH$_2$=(CH$_3$)COO(CH$_2$)$_2$(CF$_2$)$_8$F

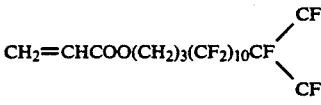

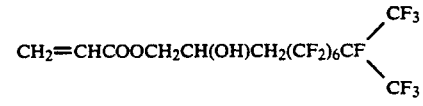

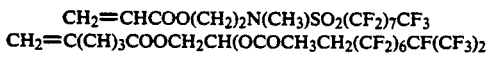

$CH_2=C(CH_3)COOCF(CF_3)_2$

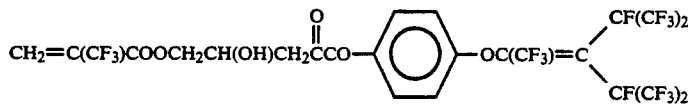

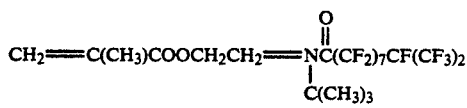

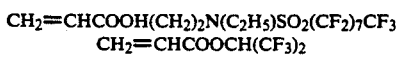

$CH_2=CHCOOCF(CF_3)_2$

An example of the material indicated by the general formula (II) is fluorine-containing vinyl ester monomer, indicated as follows.

$CH_2=CHOCOC_3H_7$ $CH_2=CHOCOCF_3$ $CH_2CHOCO(CH_2)_{10}C_8F_{17}$ $CH_2=CHOCOCH_2N(C_2H_5)SO_2C_8F_{17}$ $CH_2=CHOCO(CH_2)_{10}N(CH_3)SO_2C_8F_{17}$ $CH_2=CHOCOCCH_2NHSO_2C_8F_{17}$ $CH_2=CHOCO(CH_2)_{10}N(CH_3)SO_2C_8F_{17}$ is, for example, synthesized and polymerized by use of a process disclosed in U.S. Pat. No. 2,841,573

An example of the material indicated by the general formula (III) is fluorine-containing vinyl ketone derivative, indicated as follows.

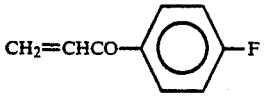

$CH_2=C(CH_3)COSCH_2CH_2(CF_2)_6CF(CF_3)_2$ $CH_2=CHCOCH_2F$ $CH_2=C(CH_3)COSCH_2CH_2(CF_2)_6CF(CF_3)_2$ is, for example, synthesized and polymerized by use of a process disclosed in B.P. No. 1,211,034.

An example of the material indicated by the general formula (IV) is fluorine-containing vinyl ether derivative, indicated as follows.

$CH_2=CHOCF(CF_3)_2$

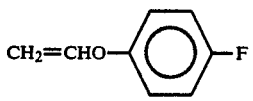

$CH_2=CHOCF_3$ $CH_2=CHOCH_2CF_3$ $CH_2=CHOCH_2CH_2CH_2F$ $CH_2=CHOCH_2CF_2CF_3$ $CH_2=CHOCH_2CH_2CH_2CH_2F$ $CH_2=CHOCH_2((CF_2)_2CF_3$ $CH_2=CHOCH_2(CF_2)_4CF_3$ $CH_2=CHO(CH_2)_2(CF_2)_9CF_3$ $CH_2=CHOCH_2(CF_2)_2CF_3$ is, for example, synthesized and polymerized by use of a process disclosed in U.S. Pat. No. 2,732,370.

An example of the material indicated by the general formula (V) is fluorine-containing acrylamide derivative, indicated as follows.

$CH_2=C(CH_3)CONHCH_2CF_2H$ $CH_2=C(CH_3)CONHCH_2CF_2CH_3$ $CH_2=C(CH_3)CONHCH_2CF_3$ $CH_2=C(CH_3)CONH(CH_2)_3CF_3$ $CH_2=C(CH_3)CON(CH_2CF_2H)_2$ $CH_2=C(CH_3)CONCH_2CF_3$ is, for example, synthesized and polymerized by use of a process disclosed in U.S. Pat. No. 2,521,902.

Even from amongst these compounds, the following material (XI) can be selected for particular consideration.

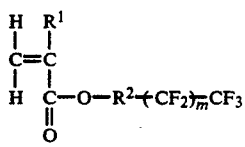

(XI)

[Where: $R^1$: hydrogen, $-C_nH_{2n+1}$ or $-C_nF_{2n+1}$ (with n=1 or an integer, $n \geq 2$)

$R^2$: $-(CH_2)_p-$ (where p is an integer, $p \geq 1$) or $-CH_2-_qN(R^3)SO_2-$ (with $R^3$ is $-CH_3$ or $-C_2H_5$ where q is an integer, $q \geq 1$)

m: an integer, $m \geq 6$]

Accordingly, the following compounds are given as the most desirable compound for use as the member for the surface of the recording medium (A) of the present invention.

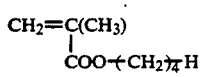
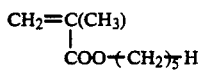
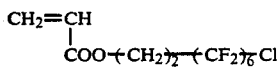
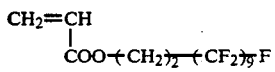
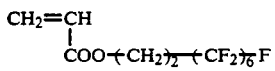
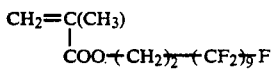
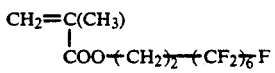
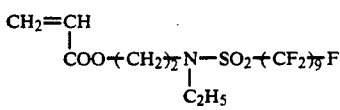
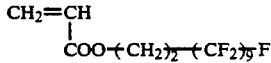
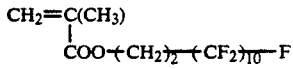
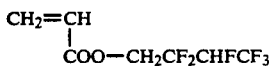
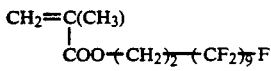
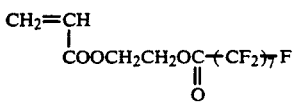

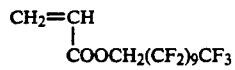
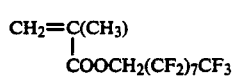
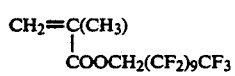

In addition, the copolymers forming the recording medium according to the present invention are also made of one of a plurality of the following polymerizable compounds (including monomer with active hydrogen group) other than the polymerizable compounds including the fluoroalkyl represented by (I) through (V).

The polymerizable compounds of which the above copolymers are made are ethylen, vinyl acetate, vinyl chloride, vinylidene chloride, vinyl fluoride, acrylic acid , styrene, α-methylstyrene, p-methylstyrene, acrylic ester of acrylic acid or methacrylic acid, benzyl acrylate or methacrylate, vinyl acrylic ether, acrylic vinyl ether halide, vinyl arcylic ketone, cyclohexeyl acrylate or methacrylate, maleic acid anhydride, butadiene, isoprene, chloroprene, vinyl alcohol, monomer with hydrophilic group, monomer with fluoride, and so on. A structure unit having one or a plurality of the compounds described above is copolymerized so that the copolymer forming the recording medium can be obtained.

In addition, a copolymer is made from a monomer represented by formula (XI) and at least one of the following monomers each having a functional group.

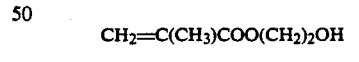
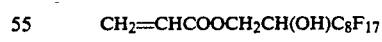

As a result, many functional groups are formed in the copolymer. In this manner, the manufactured substance has excellent properties as a crosslinking type of polymer. Either formaldehyde, dialdehyde, N-Methylol compounds, dicarboxylic acid, dicarboxylic acid chloride, bis-halogen compounds, bis epoxide bis aziridine diisocynanate and the like can be used as the crosslinking agent. The following is one example of a crosslinking polymer obtained in this manner.

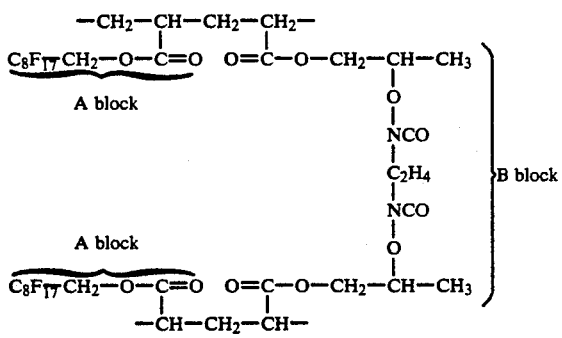

In the above formula, the A block is an alkyl group that brings on the previously described change in the thermal nature. The B block is the agent that crosslinks property of chain polymers (with diisocyanate being used as the crosslinking agent).

Obtaining a film by crosslinking involves coating a substrate with a liquid that is a mixture of the previously described copolymer and a crosslinking agent and then either heating or irradiating electrons or light so that a crosslinked film is obtained.

The surface portion of the recording medium according to the present invention is formed of the material which is obtained by the polymerization or the copolymerization of a proper one or a plurality of the various polymerizable compounds so that it is possible to improve the fundamental characteristic regarding the receding contact angle for aqueous solution on the surface of the recording medium. It is also possible to improve the durability, drysoil resistance, abrasion resistance, flexibility and so on, of the surface of the recording medium.

A fluoride-containing monomer is generally treated by a solvent which includes freon regulated for use. However, in the case where a copolymer of the fluoride-containing polymer and the general purpose monomer is used for making the surface portion of the recording medium, the fluoride-containing monomer is treated by the general purpose solvent so that there is no environmental problem concerning the ozone layer in the atmosphere being broken. For example, the fluoride-containing monomer, such as the fluoride-containing methacrylate containing the perfluoroalkyl, and a monomer are copolymerized. The monomer is a structure unit of a polymer which is dissolved by a general solvent such as polymethacrylic acid alkyl ether. In this case, the copolymer is dissolved by a general solvent such as hexane and a recording medium function is manifested in the copolymer.

As shown in the syntheses examples 3 through 6, which will be described later, it is possible for the copolymer to be dissolved by a general solvent such as hexane. In addition, the function indicated in the example 18, as will be described later, is manifested in the copolymer.

In the copolymer according to the present invention, it is possible to control the heat reversible temperature. It is also possible to change the heat reversible transition temperature and a hysteresis of the dynamic contact angle for an aqueous solution on the surface of the copolymer before and after the copolymer is heated with the contact material (B).

The polymer or the copolymer used for the recording medium according to the present invention is obtained by use of either bulk polymerization, solution polymerization, suspension polymerization, emulsification polymerization, radiation polymerization, electrolysis polymerization, plasma polymerization, plasma-initiated polymerization, deposition polymerization, photo polymerization or the like. An initiator is, for example, an organic oxide, azo-compound, persulfuric acid salt or the like. An ionizable radiation, such as -ray, is also used for the initiator. When a surface active agent is used for the polymerization or the copolymerization, it is possible to mostly use various emulsifying agents, such as an anionic agent, an cationic agent and a nonionic agent, as the surface active agent.

In addition, it is possible to obtain the material suitable for the recording medium by a process where the polymerizable compounds described above are dissolved by a proper organic solvent and the solution polymerization is performed with an operation of the initiator.

The following will describe the compound indicated in FIG. 1B. Here, the materials indicated in formula (XII), (XIII) and (XIV) are as follows.

     (XII)

     (XIII)

     (XIV)

Rf: alkyl group with $C_4$ or more, or a functional group including a fluorine or chlorine substitution alkyl group, or a hydrophobic group with $(CF_2)_l$, $(CH_2)_l$,

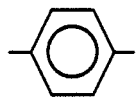

(where $l \geq 4$)
n: integer greater than 1
X: chlorine, methoxy group or ethoxy group It is desirable that this material be a material which is either physically or chemically bonded to an inorganic surface such as glass, metal, copper or some other inorganic material, or regin, polyimide, polyester, polyethylene, terephthalate or the like (and preferably a material that has a surface energy of approximately 50 dyn/cm or less).

The following are specific examples of the materials in formula (XII), (XIII) and (XIV).

| | |
|---|---|
| $CF_3(CF_2)_5COOH$, | $H(CF_2)_{10}-CH_2OH$, |
| $CF_3(CF_2)_7COOH$, | $F(CF_2)_6CH_2CH_2-Si(CH_3)_2Cl$, |
| $CF_3(CF_2)_7(CH_2)_2OH$, | $CF_2Cl(CF_3)CF(CF_2)_5COOH$, |
| $H(CF_2)_{10}-COOH$, | $CF_3(CF_2)_7(CH_2)_2SiCl_3$ |

The compound indicated in FIG. 1C can have a structure where there is only the material of formula (XII), (XIII) or (XIV).

The following will be a description of a recording medium (A) using the compounds described above.

(3) Forming process of the recording layer:

The configuration of the recording medium (A) is such that it is (1) formed by the previously described surface member itself, or (2) formed by the previously described surface member on a supporting member (preferably a supporting member having heat resistance). Those of the above compounds (surface members) which apply to (1) above, have either a plate or a film shape, or can be formed as cylinders. In this case, it is desirable for film shapes to have a film thickness of between 1 μm and 5 mm.

In the case of compounds pertaining to (2) above, it is permitted for the above described compound to permeate some distance into the supporting body. It is desirable that the film thickness of the recording medium (A) itself be from 30Å to 1 mm. However, with respect to the thermal conductivity, a film thickness of between 100Å and 10 μm is better, and with respect to the friction resistance, a film thickness of 10 μm to 1 mm is better. It is desirable that the heat resist temperature of the supporting body be between 50° C. and 300° C.

The shape of the supporting body can also be a belt shape, a plate shape or a drum shape. The shape of the supporting body can be selected according to the usage of the apparatus. In particular, drum shapes have the advantage of being able to ensure good dimensional accuracy. In the case of plate shapes, the size is determined in accordance with the size of the recording paper to be used.

Moreover, when the above described compounds (material formed on the surface of the recording medium (A) are mixed and other members such as hydrophobic monomers and hydrophobic inorganic materials and formed on a supporting member, there is the advantage of preventing dirtying of the base when printing is performed.

In addition, in order to raise the thermoconductivity, metal powder or the like can be mixed in with the above described compound. Furthermore, in order to increase the adhesiveness between the supporting member and the above described compounds, a primer layer can be provided between the support layer and the compound. The heat resistant supporting layer can be a polyamide, a polyester or another type of resin film, glass, a metal such as Ni, Al, Cu, Cr, Pt or the like, or a metallic oxide. This supporting bodies can be smooth, rough or porous.

The recording layer of the recording medium according to the present invention is obtained as follows.

The polymer or the copolymer is dissolved by a predetermined solvent so that a solution or a emulsion is obtained. The solution or the emulsion is, further, dissolved with heat so that an original solution is obtained. The original solution is coated by use of a well known process, such as impregnation process, dipping process, spray process, brushing process, spin-coating process and bar-coating process. The coating material (the original solution) which forms the recording layer is directly coated on the base member or coated on a medium layer which is provided on the base member. The medium layer can be a porous film or a material in which interactions with both the recording layer and the base member are performed.

In a recording process according to the present invention, it is possible to transmit heat for forming the latent image on the recording layer through the base member to the recording layer. In this case, the base member is directly heated so that it is desirable that a heat resistance layer be provided on the base member to prevent the recording medium (the base member) from deteriorating. The heat resistance layer is formed of a thermosetting resin, resin having high softening temperature or the like. It is preferable that an the inorganic pigment, such as talk, mica powder, fine silica powder, fine powder made of molybdenum disulfide, is contained in the heat resistance layer. The resin forming the heat resistance layer is a silicone resin, fluoride resin, epoxy resin, melamine resin, phenol resin, polyimide resin, nitrocellulose or the like.

The following will be a description of the contact material (B).

The contact material (B) is as has been described earlier, in that it is either a liquid or a vapor from its initial state, or is a solid that ultimately becomes a liquid at temperature less than the commencement temperature for lowing the receding contact angle $\theta r$ in the recording medium (A). This vapor becomes a liquid when at least one portion of it condenses in the vicinity of the surface or on the surface of the recording medium (A). Then, this liquid is sufficient to wet the surface of the recording medium (A). On the other hand, the solid is one that either becomes a liquid, or generates a liquid, or generates a vapor, at a lowering commencement temperature of the previously described receding contact angle $\theta r$. The vapor generated by the solid condenses in the vicinity of the surface or on the surface of the recording medium (A) to form a liquid as has been described for the earlier example.

The following is a more specific description of this contact material (B).

This is to say that the liquids that form one of the contact materials (B) are, in addition to water, water soluble liquids that include electrolytes, ethanol, n-butynol and other alcohols, glycerine, ethylene glycol and other multivalent alcohols, liquids having polarity such as methyl ethyl ketones and other ketones, n-nonans, n-octane and liquids not having polarity such as other chain hydrocarbons, cyclohexanes and other circular hydrocarbons, meta-xylene, benzene or other circular hydrocarbons. In addition, a substance that is a mixture of these is also suitable. Various types of dispersed liquids and liquid inks can also be used. However, liquids having polarity are more suitable.

In addition to water vapor which is one of the vapors that can be the contact material (B), it is also possible to use a contact material (B) liquid that has been vaporized. In particular, ethanol vapor and meta-xylene vapor and other vapors of organic compounds (including those that are mist status) can be used. The temperature of these organic vapors must be less than the softening point or the less than the melting point of the compound that forms the surface of the recording medium (A).

Some of the solids that can be the contact material (B) are high-class fatty acids, low molecular weight polyethylene, macromolecules gel (poly acryl amido gel, poly vinyl alcohol gel), silica gel, and hydrated compounds.

Although it will be explained in further detail later, when the contact material (B) is a "recording agent that contains a colorant" such as the previously described liquid inks, the formation of the latent image and the developing of the image are performed simultaneously.

The following is a description of the heating apparatus.

The heating apparatus can be a heater, a thermal head or another type of contact heating apparatus, but can also be a non-contact type of heating apparatus that uses electromagnetic radiation (such as laser light, infra-red radiation lamps or some of type of light that is irradiated from a light source and focussed through a lens). In addition, electron beam irradiation or ultra-violet light irradiation can also achieve the method of the present invention if there is effective heating.

Figure 2A:
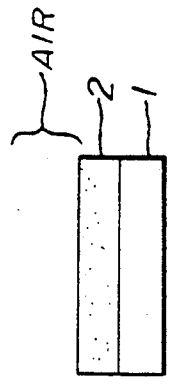
FIGS. 2A, 2B, 3A, 3B and 3C are views for describing the fundamental aspects of the image recording method of the present invention.
Figure 2B:
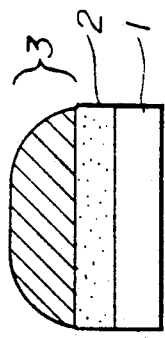

In FIG. 2A, a film 2 of the previously described compound is formed to configure a surface of a recording medium (A) on a substrate 1. This film surface is kept in contact with a liquid 3 which is one of the materials of the contact material (B). In this status, when the film 2 is heated, the surface of the film 2 has its receding contact angle θr lowered and exhibits considerable wetting, and the adhesion of the liquid is recognized. In addition, this film 2 that has liquid adhesiveness is heated again in either the atmosphere, in a vacuum, or in an atmosphere of an inert gas (FIG. 2B). When this is done, the surface of the film 2 has its receding contact angle θr raised and water repellency can be recognized.

One method which exhibits this phenomena and similar phenomena has been mentioned as being disclosed in Japanese Patent Laid Open Publication No. 54-41902. However, this disclosed method differs from the method of the present invention in that the recording material is effectively disordered and in that the mechanism obtains a layer of an amorphous memory substance. This is to say that in the present invention, it is not possible to have a change in the status of the surface of the recording medium (A) without the presence of the contact material (B). In addition, in the method disclosed in Japanese Patent Publication No. 54-41902, it is not possible to reverse the method by a simple operation.

Figure 3B:
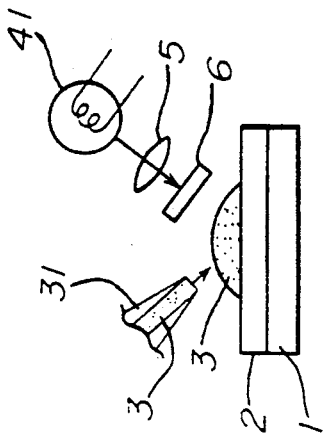
Figure 3A:
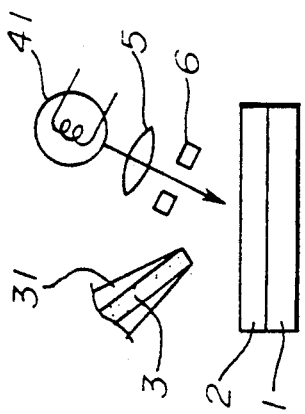

As is indicated in FIG. 3A, when the liquid 3 is in contact with the film 2 and heating is performed corresponding to the image information, then (as shown in FIG. 3B) for the status where there is no liquid, heat corresponding to the image information is applied to the film 2. This is the same as if the liquid 3 was brought into contact with the film 2 when the film 2 was in the heated status.

The surface of the film 2 of the heated portion becomes the area to which the liquid adheres. In FIGS. 3A and 3B, a heater 4 turns on and off in accordance with the image information. Liquid 3 supplied from a liquid supply opening 31 is supplied to the film 2. Heat radiation from an infra-red heater 41 is irradiated to the film 2 via a lens 5 and a shutter 6.

Figure 3C:
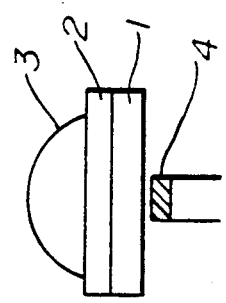

The shutter 6 turns on and off in accordance with the image information. FIG. 3A indicates an example where the heating of the film 2 is performed through the substrate 1. In the example indicated in FIG. 3C, the heating is performed through the liquid 3.

Then, FIG. 4 indicates one example of the changes in the contact angle for a water-soluble liquid on the film 2 for the status where a water-soluble liquid is brought into contact with the film 2, and shows the changes in the contact angle for prior to and after heating, and for when this substance is further heated in air. In FIG. 4, O represents the advancing contact angle and Δ represents the receding contact angle.

In general, when the receding contact angle is a high value of 90° or more, then that surface exhibits liquid repellency. When the receding contact angle is 90° or lower, then that surface exhibits liquid adhesion.

In the status of contact with the contact material (B), the heating temperature for the surface of the recording medium (A) should be in the range of 50° C. to 250° C. This heating temperature should preferably be in the range of 80° C. to 150° C. The heating time should be in the range of from 0.1 m to 1 second, but preferably should be in the range of 0.5 m-sec to 2 m-sec. The heating timing is determined as follows. ① After the surface of the recording medium (A) has been heated, the contact material (B) is brought into contact before the surface of the recording medium (A) can cool. ② In the status where the contact material (B) is in contact with the surface of the recording medium (A), the surface of the recording medium (A) is heated. Either the above ① or ② can be performed. When the latent image is to be erased, the surface of the recording medium (A) is heated to 50° C. to 300° C. or more preferably to 100° C. to 180° C. in the status where the contact material (B) is not in contact. In either of the cases, the heating time is from 1 m-sec to 10 sec or more preferably, from 10 m-sec to 1 sec.

The following is a description of the processing for the actual recording of the image information on the surface of the recording medium (A).

Figure 5A:
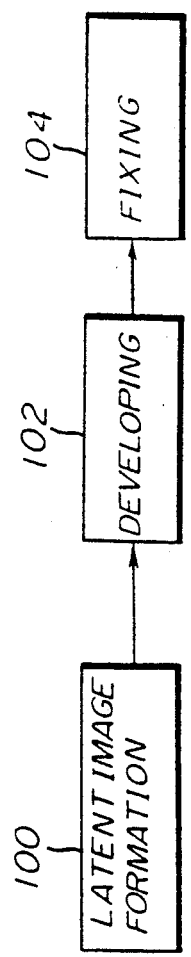
FIGS. 5A, 5B and 5C are views indicating the steps of the image recording method of the present invention.
Figure 5B:
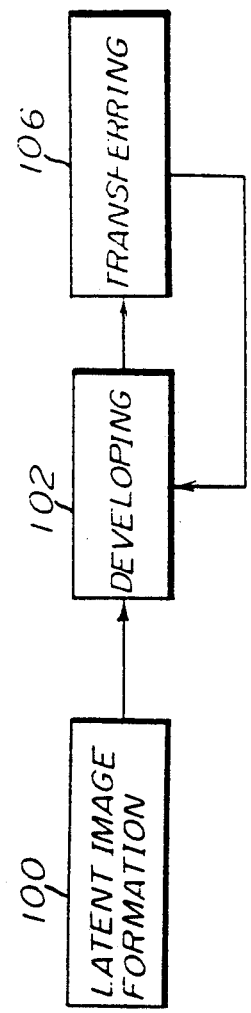
Figure 5C:
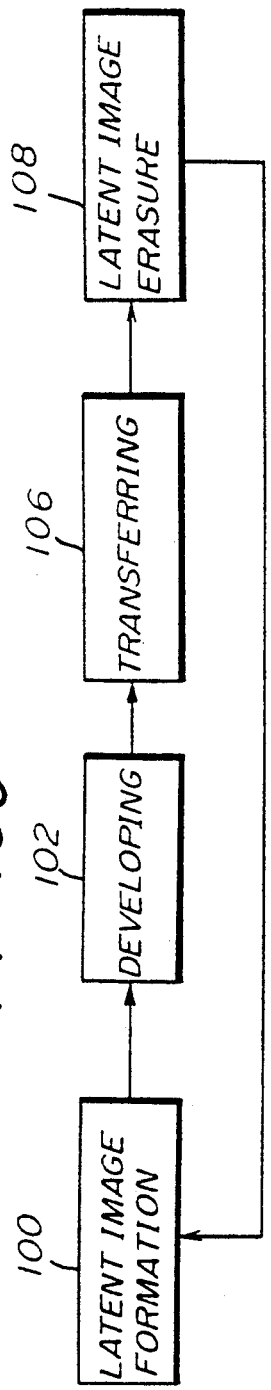

As is indicated in FIG. 5A, heating is applied to the surface of the recording medium (A) in accordance with image signals and in the presence of a liquid or vapor atmosphere, and liquid adhesion areas are formed on the surface of the recording medium (A) (latent image formation step 100). After this, processing whereby a recording agent is brought into contact with this latent image portion is performed to make the recording agent adhere to the latent image portion (developing step 102). Then, this method whereby fixing (fixing step 104) is performed for on the surface of the recording medium (A) is called a direct recording method. As is indicated in FIG. 5B, the surface of the recording medium (A) is heated in accordance with image signals and in the presence of a liquid or vapor atmosphere, and liquid adhesion areas are formed on the surface of the recording medium (A)(latent image formation step 100). After this, processing whereby a recording agent is brought into contact with this latent image portion is performed to make the recording agent adhere to the latent image portion (developing step 102). Then, the recording agent on the surface of the recording medium (A) is then transferred to recording paper in what is called the indirect recording method. Furthermore, as is indicated in FIG. 5B, after the transfer of the recording agent, if processing to transfer the recording agent once again to the latent image portion is then performed, then the recording medium (A) is used as a printing plate in a printing method. In addition, in the above described method and as is indicated in FIG. 5C, after the transfer of the recording agent (step 106), then in the status where there is no liquid nor vapor, the surface of the recording medium (A) upon which the latent image has been formed, is heated and the latent image removed (latent image erasure step 108) so that the recording method is such that the reuse of the recording medium (A) is possible (i.e. a repeat recording method).

The following will described structure of the recording medium (A) and the configuration of an apparatus that performs image formation in accordance with the recording method.

If the recording medium (A) is a substance that has a surface for which the receding contact angle lowers when it is heated and a liquid is brought into contact with it (for convenience of explanation, this will be hereinafter termed the "film 2" or the "surface of the recording medium (A)"), then it can be of any shape. Accordingly, the recording medium (A) can be either a rigid cylindrical shape or a flexible film shape. A recording medium with a rigid cylindrical shape (i.e. a rigid cylinder around which a film 2 has been applied) enables the position and the like to be easily controlled by moving the cylinder. Accordingly, it is desirable that a rigid cylinder be used as the recording medium. Such a recording medium is manufactured by forming a film 2 on a substrate. The formed body can even be the recording medium itself. In particular, the previously described recording medium is generally mechanically weak and so it is desirable that it be formed upon a substrate. Even in cases where the formed body forms the recording medium (A), the film 2 must be formed on the surface of it.

If a resin is used as the substrate for the recording medium, then it is unlikely to have a good heat conductivity and it will be necessary to have a certain amount of time for from when the surface of the recording medium (A) is heated, until it achieves liquid adhesiveness. Therefore, a good heat conductor is used for either all or part of a substrate.

In FIG. 6A, a good conductor such as a metal is used as the substrate (metal substrate 11). On the top of this metal substrate 11 is vapor deposited an organic film 12 and on top of this is coated a film 2. By this structure, it is possible to improved the speed of thermal conductivity in the vertical direction. The organic film 12 used is a polyimide, a polyester, or a phthalocyanine or the like. This structure is thought to be sufficient in cases where the printing head is relatively large. However, it is not suited to applications for high-precision printing because heat dispersal in both directions causes the portion having liquid adhered to enlarge. The structure indicated in FIG. 6B has a good heat conductor portion on a substrate 1 divided by a partition so that heat dispersal in both directions is prevented. Doing this reduces the size of the portion 2a that has the liquid adhering property. In FIG. 6B, the partitioned and limited metallic film 11a is provided on a heater 4.

The following will be a description of the mechanism for forming the latent image by heating. As has already been described, the heat source can be a heater, a thermal head or some other type of contact heater, or a laser beam, an infra-red lamp or some other type of non-contact heater that uses electromagnetic radiation.

The following will be a description of the conceptual structure of the mechanism for heating the surface of the recording medium (A) in the status where it is in contact with a liquid.

The following is a description of an example using a recording medium 7 of the type where the film 2 is formed on a substrate 1.

Figure 7A:
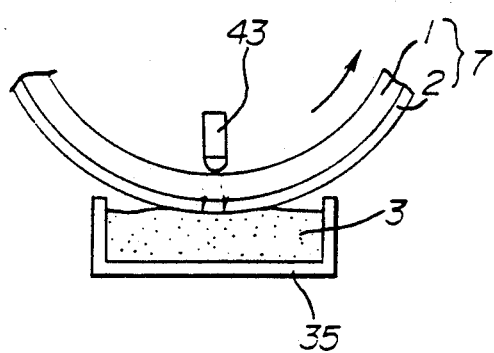
Figure 7B:
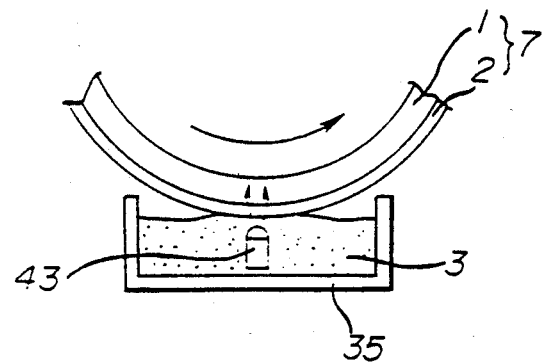
Figure 7C:
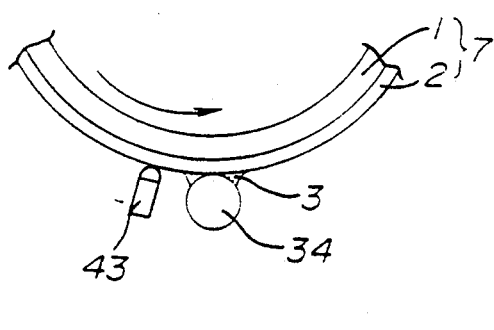
Figure 7D:
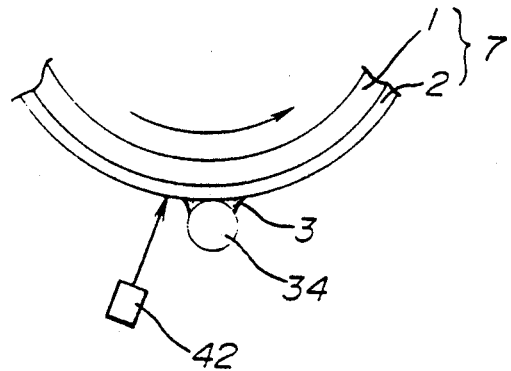

As is indicated in FIGS. 7A and 7B, the liquid 3 is always in a state of contact with the lower surface of a recording medium 7 which is in a drum shape. Then, in this status, when the recording medium 7 rotates, the recording medium 7 is selectively heated in accordance with the image information, from side of the substrate 1 or the side of the liquid 3. As is indicated in FIG. 7C, the surface (film 2) of the recording medium 7 is selectively heated in accordance with the image information. Then, immediately after, the surface of the recording medium 7 is brought into contact with the liquid 3. As is indicated in FIG. 7D, the laser beam from a laser light source 42 can be used to selectively heat the surface of the recording medium 7.

As is indicated in FIGS. 7A and 7B, a vat 35 filled with the liquid 3 is provided at the lower portion of the recording medium 7 and the lower surface of the recording medium 7 is always in contact with the liquid 3 in the vat 35. Then, the heat source (a thermal head 43) of the most simple configuration is disposed in the middle of the vat 35 or in the vicinity of the vat 35. Instead of the vat 35, or sponge type of porous substance 34 filled with the liquid 3 can be provided so that it is contact with the surface of the recording medium 7. In addition, it is also possible to heat the surface of the recording medium 7 by an electron beam.

As has been described above, the surface of the recording medium 7 is heated and the liquid 3 is brought into contact with the surface of the recording medium 7 so that the areas with liquid adhered to them have a small receding contact angle $\theta r$ and form the latent image.

Figure 8:
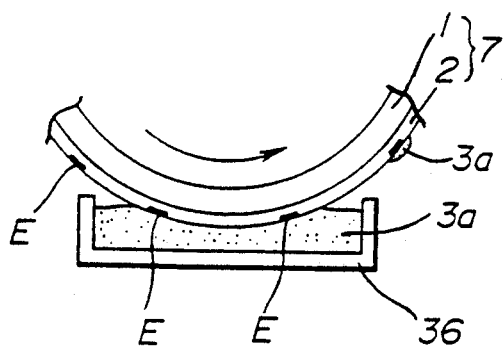

A recording agent (ink) is adhered to the liquid adhesion area selectively applied to the surface of the recording medium 7 in accordance with the information signals and by the mechanism that has been described above, has, as shown in FIG. 8, a vat 36 filled with recording agent 3a and disposed in the direction of movement of the recording medium 7 and with respect to the position for the formation of the latent image and having a simple configuration so that the recording agent 3a is always in contact with the surface of the recording agent 3a is always in contact with the surface of the recording medium 7.

Figure 9:
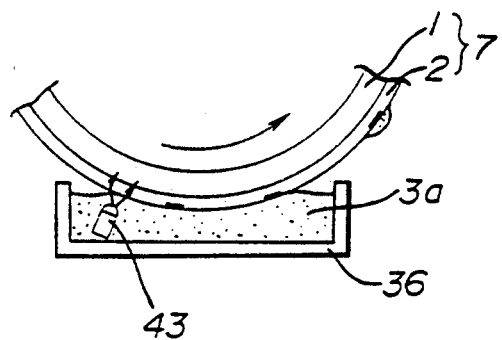

When the recording medium 7 rotates, the liquid recording agent 3a is adhered to the liquid adhesive area (latent image) E formed as described above. This recording agent 3a that adheres to the surface of the recording medium 7 forms a visible image. In FIG. 9, the liquid recording agent 3a is filled in the vat 36 and is in a status where the surface of the recording medium 7 is always in contact with it. Then, the thermal head 43 selectively heats the surface of the recording medium 7 from the side of the recording agent 3a. In the configuration shown in FIG. 9, the signal recording agent 3a enables the formation of the latent image and the developing of the latent image and therefore enables the apparatus to be made compact.

Figure 10:
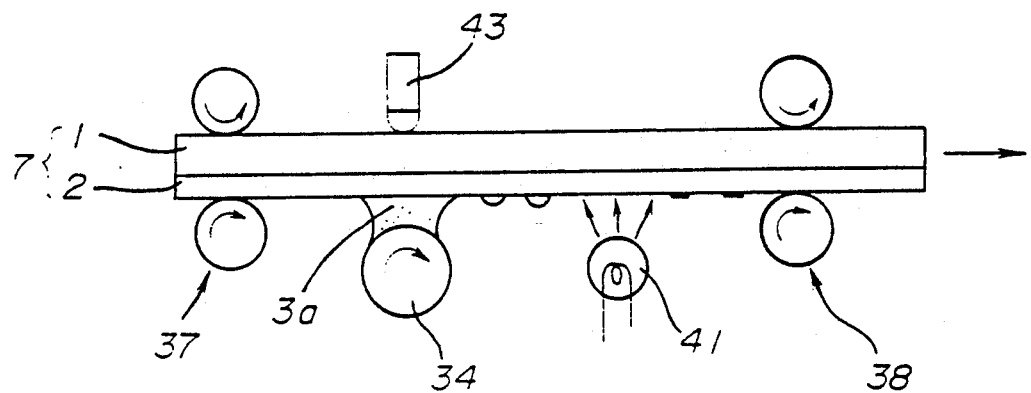

FIG. 10 indicates an example of the direct formation of a visible image on the surface of the recording medium 7.

A film having flexibility or a rigid film is used as the recording medium substrate 1. This substrate 1 and the film 2 formed upon the substrate 1 configure the recording medium 7. The recording medium 7 is conveyed at a constant speed by the rollers 37 and 38. A porous roller 34 into which the recording agent 3a has been impregnated is in a status of contact with the surface of the recording medium 7 (i.e. the film 2). The side of the recording medium 7 opposite the side having the recording agent 3a is selectively heated in accordance with the image information, by a thermal head 43. In the status where this recording agent 3a is in contact wit the recording medium 7, the heating of the recording medium 7 contact wit the recording medium 7, the heating of the recording medium 7 performs the formation of the latent image and the developing of the latent image on the surface of the recording medium 7. Then, the recording agent 3a (the latent image) adhered to the surface of the recording medium 7 is heated and dried by a infra-red heater 41. This heating and drying fixes the recording agent 3a adhering to the surface of the recording medium 7. The drying of the recording agent 3a can also be performed naturally.

Figure 11:
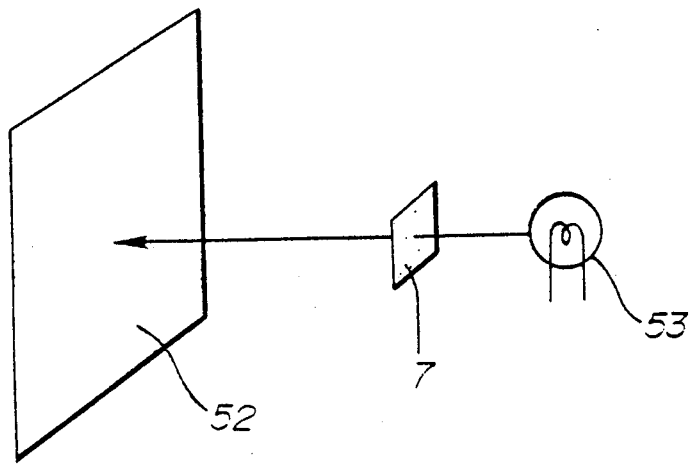
Figure 12:
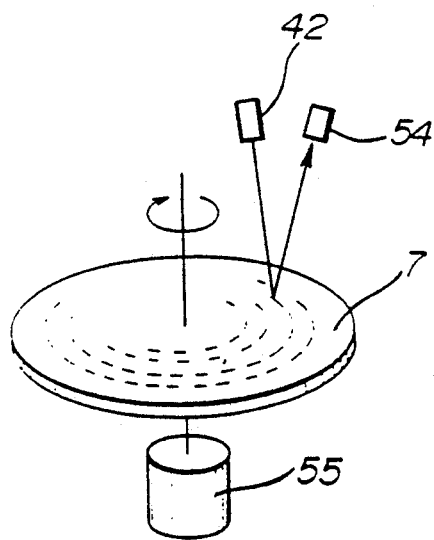

As has been described above, the recording medium 7 which is a transparent film to which the recording agent 3a has been adhered, can be, as indicated in FIG. 11, used as a slide film for projection. This is to say that when light is illuminated from a light source 53 placed behind the surface of the recording medium, the image on the recording medium 7 is projected onto a screen 52. In addition, as indicated in FIG. 12, it is possible to used it as an information storage medium. This is to say that in the status where the discus type recording medium 7 is rotated at a constant speed by a motor 55, a beam of light from a laser light source 42 is irradiated to the recording medium 7. It is possible to read the information by detecting the strength of the light reflected in accordance with the presence or absence of the recording agent 3a on the surface of the recording medium 7.

Figure 13:
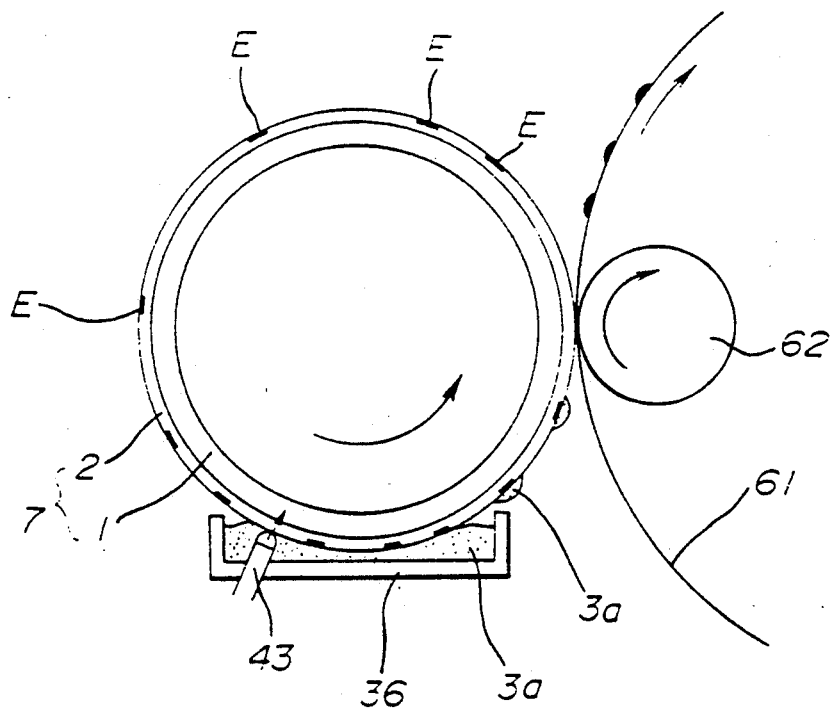

FIG. 13 through FIG. 14 indicate an apparatus having a mechanism (an indirect recording mechanism) for transferring a visible image formed on a recording medium to recording paper.

In indirect recording for transferring a visible image to recording paper, it is advantageous to use a rigid cylindrical tube as the recording medium substrate 1.

FIG. 13 indicates a printing apparatus. In FIG. 13, the recording agent 3a is filled in the vat 36. In the status where a lower surface of the recording medium 7 is in contact with the recording agent 3a, the recording medium 7 is rotated at a constant speed. A thermal head 43 selectively heats the surface of the recording medium 7 in contact with the recording agent 3a, in accordance with image information. As has already been explained, the heated areas of the surface of the recording medium 7 have the recording agent 3a adhered to them. Then, the recording agent 3a adhering to the surface of the recording medium 7 is transferred to the recording paper 61 conveyed between the recording medium 7 and the transfer drum 62, by the capillary action of the recording paper 61. The position where this transfer is performed can be either after the developing or at any position along the length of the recording medium 7. However, it is preferable that the transfer be performed immediately after developing.

In the apparatus indicated in FIG. 13, the recording agent 3a remains on the surface of the recording medium 7 in the adhesion area E even after the transfer has been performed. Accordingly, when this recording agent 3a in this area E is contacted, the recording agent 3a readheres to this area E and the recording agent 3a is transferred to the recording paper 61 once again. This is to say that the latent image is not erased from the surface of the recording medium 7 and so developing and transfer can be repeatedly performed to enable printing.

When the printing of one image information has been completed, the exchanging of the recording medium 7 or the performance of latent image erasure can enable the printing of different image information.

Figure 14A:
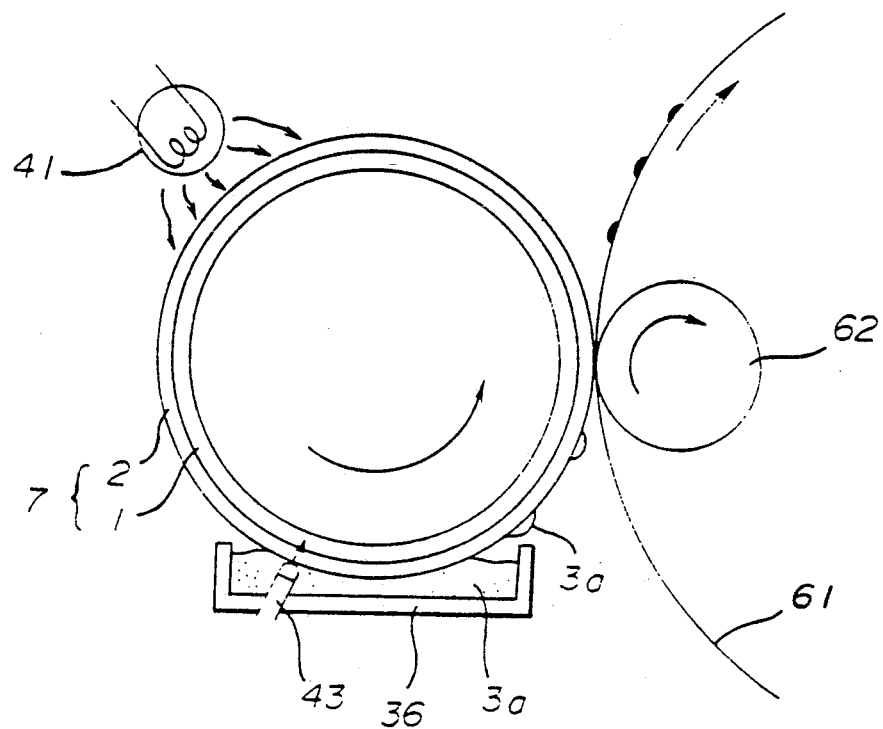

FIG. 14A indicates a recording apparatus for which different images can be successively formed.

The apparatus shown in FIG. 14A has the same mechanisms for latent image formation, latent image developing, and transfer, as the apparatus indicated in FIG. 13.

After transfer, in the status where the liquid or the vapor are not present, then an infra-red heater 41 is provided to heat the surface of the recording medium 7. This heating by the infra-red heater 41 erases the latent image from the surface of the recording medium 7. By erasing the latent image from the surface of the recording medium 7, it becomes possible to reuse the recording medium 7.

In addition, in the status where the liquid or the vapor are not present, that is to say, in air, in a vacuum or in an atmosphere of an inert gas, the heating of the latent image portion erases the latent image from the surface of the recording medium 7. The heating apparatus can be a heater, a thermal head or another type of contact heating apparatus, but can also be a non-contact type of heating apparatus that uses electromagnetic radiation. The heating can be performed for the entire surface or can be performed only for the latent image portion. However, it is possible to have a simpler mechanism when the entire surface is heated. Moreover, as soon as the latent image erasure mechanism performs the heating for the purpose of erasing the latent image, the surface of the recording medium 7 is effectively cooled to a normal temperature in the time until the next latent image is formed. The heating temperature necessary for the erasure differs according to the material of the surface of the recording medium 7. This heating temperature should desirably be a temperature lower than the decomposition point and higher than the commencement temperature for the lowering of the receding contact angle $\theta r$ of the material of the surface of the recording medium 7.

The recording paper (transfer medium) can be a transparent resin film, plain paper, ink jet paper, or typing paper or the like.

Figure 14B:
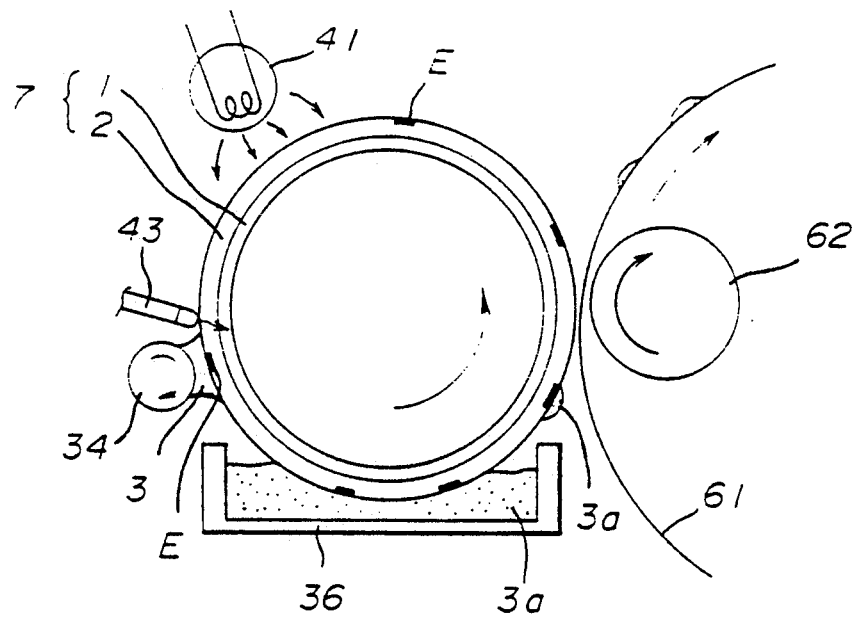

FIG. 14B indicates a recording apparatus that can successively form different latent images in the same manner as the apparatus indicated in FIG. 14A. In the apparatus indicated in FIG. 14B, the process for the formation of the latent image and the process for the developing of the latent image are not performed simultaneously as they are in the apparatus indicated in FIGS. 13 and 14.

In FIG. 14B, a porous sponge roller 34 impregnated with liquid 3 is provided at a position at the front with respect to the direction of rotation from the vat 36 filled with the recording agent 3a. Furthermore, a thermal head 43 is provided at a position in the vicinity of the front with respect to the direction of rotation of the porous sponge roller 34. The liquid 3 inside the porous sponge roller 34 is always in contact with the surface of the recording medium 7 heated selectively in accordance with the image information, by the thermal head 43 has liquid adhesiveness due to contact with the liquid 3. This area E becomes the latent image. The latent image formed in this manner is developed by the recording agent 3a. Then, the visible image obtained by the developing of the latent image is transferred to the recording paper 61. The processes after the transfer are the same as for the apparatus indicated in FIG. 14A.

In the apparatus indicated in FIG. 14B, the thermal head 43 (heat source) is not disposed inside the recording agent 3a and so deterioration of the recording agent 3a due to the heat is prevented. In addition, there is also no deterioration of the thermal head 43 due to the chemical substances included in the recording agent 3a.

A description will now be given of other examples of the recording apparatus.

First, an example of a recording apparatus, in which it is possible for ink adhered to the recording medium to be perfectly transferred to the recording sheet, is shown in FIGS. 15 through 19.

Figure 15:
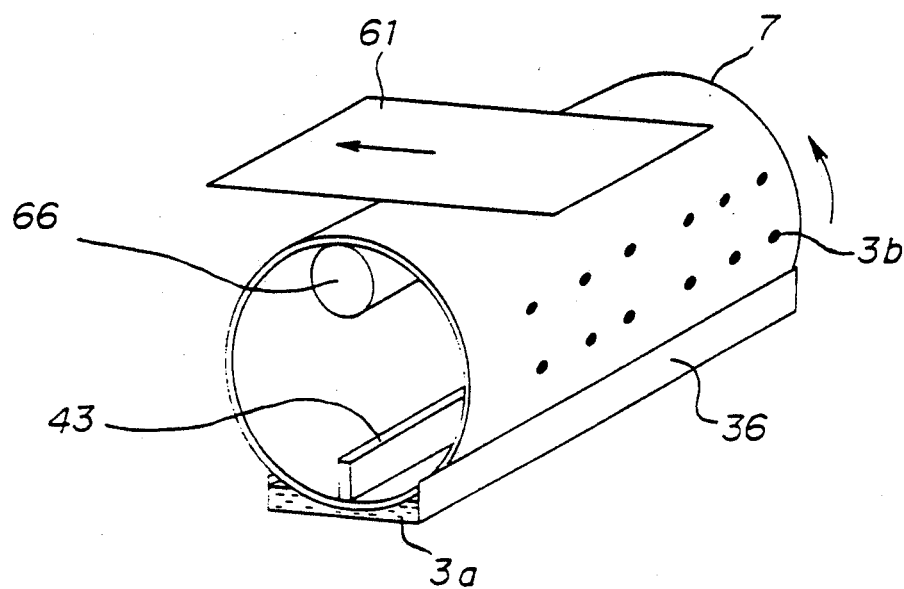
FIG. 15 shows a recording apparatus according to an embodiment of the present invention.
Figure 16:
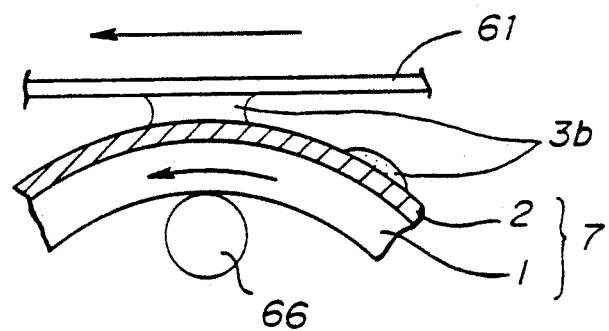
FIG. 16 shows a state where the ink is transferred.

Referring to FIG. 15, the recording medium 7 has a hollow cylindrical shape. The recording medium 7 is rotated around an axis. A part of the surface of the recording medium 7 is in ink 3a housed in vat 36. A thermal head 43 is provided in the recording medium 7 so as to face to the ink 3a in the vat 36. The heater 66 is provided in the recording medium 7 so that the adhered ink 3b is heated immediately before the adhered ink 3b is transferred to the recording sheet 61. FIG. 16 shows a state where the ink 3b adhered to the surface of the recording medium 7 is transferred to the recording sheet 61. The ink 3b is heated through the recording medium 7 having a base member 1 and a recording material layer 2 by the heater 66 so that the viscosity of the ink 3b decreases. Thus, it becomes easy for the ink 3b to flow and thus the ink 3b percolates the recording sheet 61 with ease.

A detailed explanation why the ink 3b is transferred to recording sheet 61 with ease due to the heating of the heater 66 is given below.

Figure 17:
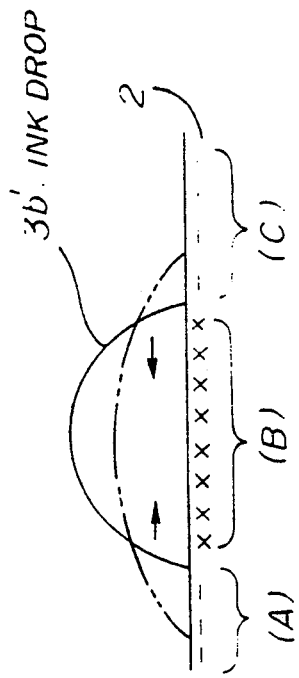
FIG. 17 shows a changing of the contact angle.

When the ink is heated, the self-aggregation of the ink increases so that the ink contracts. In FIG. 17, the shape of an ink drop is indicated by a double dotted line at the room temperature. When the ink is heated, the ink contracts so that the shape of the ink becomes that indicated by a solid line. That is, an ink drop 3b' is formed on the recording material layer 2. At this time, the recording medium 7 is also heated by the heater 66 and area (A) in the surface of the recording material layer 2 become exposed due to the contraction of the ink. Therefore, the area (A) which had been water repellent is changed into a hydrophilic area so that the area (B) which is water repellent becomes small. In this state, when the ink drop 3b' is in contact with the recording sheet 61, the ink drop 3b' rapidly percolates the recording sheet 61 due to the multiply effect obtained by the easy flowing of the ink drop 3b', the self-aggregation of the ink drop 3b' and the extension of the area which is water repellent.

After the ink drop 3b' is transferred to the recording sheet 61, the recording medium 7 is heated without liquid so that the entire area of the surface of the recording material layer 2 is completely changed into an area which is water repellent.

Figure 18:
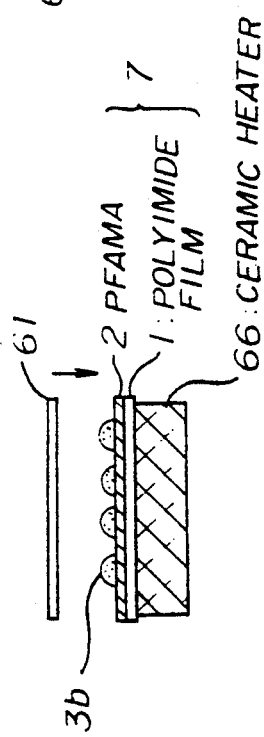

The heater 66 has, for example, a ceramic heater element. In a case where a ceramic heater 66a is used for heating the recording medium 7, as shown in FIG. 18, the ceramic heater 66a is directly in contact with the recording medium 7.

Figure 19:
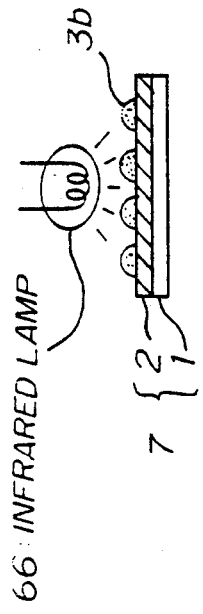
FIGS. 18 and 19 show heating mechanisms for the ink.

In addition, it is possible for the heater 66 to heat the recording medium 7 without contacting the recording medium 7. In this case, the heater 66 is made of a light source unit such as a laser unit and a infrared lamp. The light source 66b (the infrared lamp) is, as shown in FIG. 19, provided over the recording medium 7.

In this recording apparatus, when the heater is not operated at the time the ink is transferred or immediately before the ink is transferred, the hydrophilic area, corresponding to a dot image, on the recording medium 7 is maintained. Thus, when the recording medium 7 is rotated, the ink adhered to the hydrophilic area is repeatedly transferred to the recording sheet 61.

A description will now be given of examples of experiments which were performed to confirm the effect of the heating described above.

The first experiment:

A water and oil repellent agent "TG-702" manufactured by DAIKIN MANUFACTURING CO., LTD or "FLOLARD FC-72" manufactured by SUMITOMO 3M CO., LTD was used for the film material of the surface of the recording medium 7. This original liquid of the film material was diluted to double its volume by freon 113 manufactured by MITSUI FLUORO CHEMICAL CO., LTD. And then, the diluted liquid was coated on a polyimide film (KAPTON 300 V manufactured by TORAY-DUPONT CHEMICAL CO., LTD ), and then dried at 90° C. for two hours. As a result, a recording material layer of approximately 1 um was formed on the polyimide film.

A thermal head was used for the heater. Fifty hydrophilic areas were formed in a line on the surface of the recording material layer. Each of the hydrophilic areas had a size of 100 um × 100 um and the distance between every two hydrophilic areas was approximately 200 um. The water soluble ink including direct black dye was adhered to the hydrophilic areas. After that, as shown in FIG. 18, the recording sheet 61 (the normal copying paper 4032 manufactured by XEROX CO., LTD) overlapped the recording material layer 2 so that the ink drops 3a on the hydrophilic areas were transferred to the paper 61. The heater 66 is operated when the ink drops 3b were transferred to the paper 61.

As a result of the transferring of the ink drops, there were no remaining ink drops on the surface of the recording material layer 2 and the entire surface of the recording material layer 2 was changed into an area which was water repellent. On the other hand, in the case where the ink was not heated when it is being transferred, much ink remained on the surface of the recording material layer 2

The second experiment:

The recording medium, the recording sheet and the liquid ink used in this experiment were respectively the same as those used in the first experiment.

The ink on the recording material layer 2 was heated by the infrared lamp 66b, as shown in FIG. 19. The infrared lamp 66b irradiates the surface of the recording material layer 2 for three minutes. Immediately after that, the ink is transferred to the paper 61. As a result of the transferring of the ink, there was no remaining ink on the surface of the recording material layer 2, and the entire surface of the recording material layer 2 was changed into an area which was water repellent.

Figure 20A:
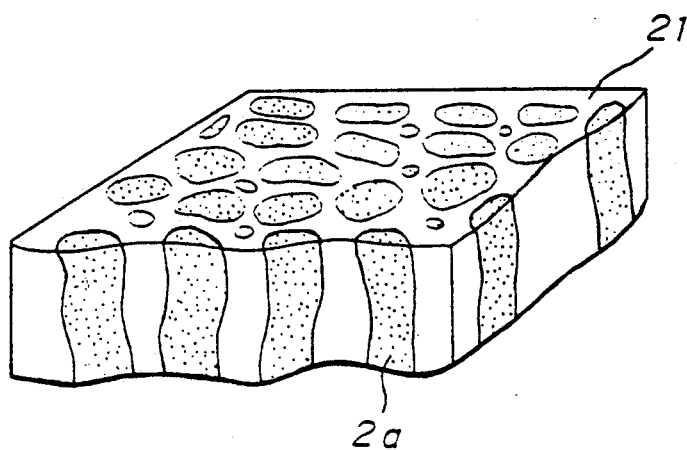
FIGS. 20A and 20B shows base members supporting PMAFA material.
Figure 20B:
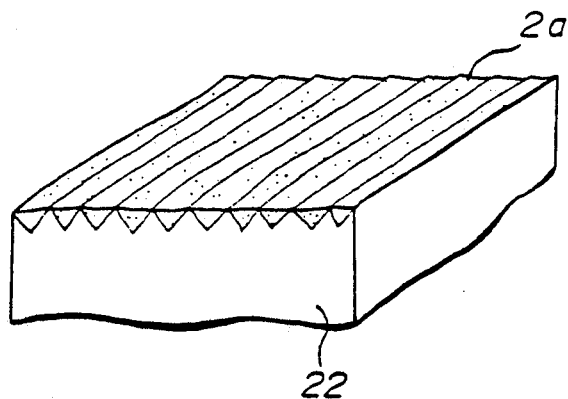

Second, an example of the recording medium used in the recording apparatus is shown in FIGS. 20A and 20B. This recording medium is very wear resistant.

Referring to FIG. 20A, the recording material 2a is kept in a porous member 21 so that the recording material is exposed on the surface of the porous member 21.

The porous member 21 is made of a porous film made of polytetra fluoroethylene, polyethylene, silicone resin and so on. The porous member 21 can also be made of a fluoride resin coated on a sintering body made of stainless steel, alumina or the like. The diameter of each pore formed in the porous member 21 is preferably substantially between 0.1 um and 1.0 um.

In the recording medium made of the porous member, the wall portion of each pore protects the recording material from the recording sheet when the recording sheet slides on the recording medium. That is, the wall portion of each pore in the porous member prevents the recording material in each pore from being worn away.

Referring to FIG. 20B, the recording material 2a is coated on a rough surface of a base member 22. The base member 22 is made of a material such as polytetra fluoroethylene, polyethylene, silicon resin and so on. Then, the rough surface of the base member 22 is formed by sandblasting or chemical etching. The base member 22 having the rough surface can be made of polytetra fluoroethylene evaporated on a metal plate or a glass plate. The surface roughness of the rough surface of the base member represented by the ten points mean roughness for the standard length of 10 um is preferably between 0.1 um and 1.0 um.

According to the recording medium made of the base member having a rough surface on which the recording material is coated, each convex portion of the rough surface protects the recording material from the recording sheet when the recording sheet slides on the recording medium. That is, each convex portion of the rough surface prevents the recording material from being worn away.

A description will now be given of examples of experiments which were performed to confirm the effect of the porous member and the rough surface of the base member on the abrasion resistance.

The first experiment:

The recording material was a water and oil repellent agent "TG-702" manufactured by DAIKIN MANUFACTURING CO., LTD. The original liquid of the material was diluted to double its volume by the freon 113 so that the recording material solution was formed. The porous member 21 comprised a filter made of tetraethylene manufactured by SUMITOMO ELECTRIC CO., LTD. The diameter of each pore in the filter was approximately 0.2 um. The filter was dipped in the recording material solution so that each pore in the filter was impregnated with the recording material solution. After that, this filter was dried at 90° C. for two hours, and then the dried filter was adhered to a polyimide film of approximately 500 um, which film is manufactured by TORAY-DUPONT CO., LTD., so that the recording medium was made, as shown in FIG. 20A.

The recording medium made of the porous member 21 having the recording material was in contact with a liquid and heated at 100° C. After that, the recording medium was heated again at 120° C. in air. In this case, the contact angle for an aqueous solution on the surface of the recording medium was changed as shown in FIG. 4. That is, the surface of the porous member in which the recording material was kept became a hydrophilic area when the surface of the porous member 21 was heated in a state where the liquid is in contact with the surface of the porous member 21. In addition, the surface of the porous member 21 was changed into an area which was water repellent after the surface of the porous member 21 was heated in air.

Figure 21:
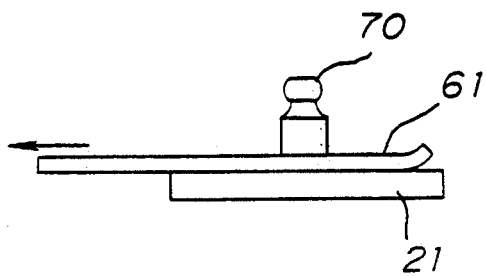
FIG. 21 shows an example of abrasion test for the base member.

The normal recording sheet 61 was pressed on the surface of the porous member 21 by a weight 70, as shown in FIG. 21, and then the recording sheet 61 slid on the porous member 21 in a predetermined direction indicated by an arrow in FIG. 21. When the recording sheet 61, to which a pressure force of 20 fg was given, slid on the surface of the porous member 21 fifty times, no scratches were formed on the surface of the porous member 21 (the recording medium).

The second experiment:

The recording material solution was made of the same material as that used in the first experiment. A rough surface was formed on the base member made of polyethylene by sandblasting. The recording material solution was coated on the rough surface of the base member, and then the base member on which the recording material solution was coated was dried at 90° C. for two hours. As a result, the recording medium was made, as shown in FIG. 20B.

When the recording medium was heated in the state where the liquid was in contact with the surface of the recording medium and the recording medium was heated in air, the contact angles for an aqueous solution on the surface of the recording medium were obtained, these angles being approximately identical to those in the first case. In the abrasion test as shown in FIG. 21, no scratch was formed on the surface of the recording medium when the recording sheet slid on the surface of the recording medium thirty times.

Figure 22:
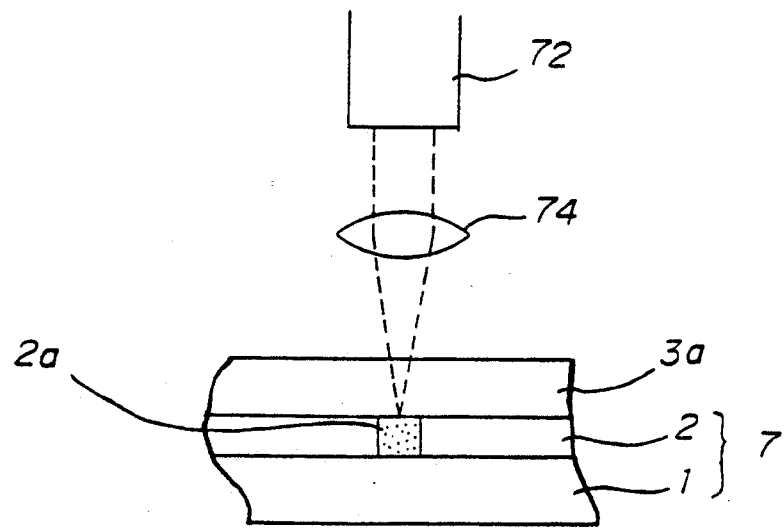
FIGS. 22 through 24 show mechanisms in which a light beam is project through the ink whose thickness is uniform onto the recording layer.
Figure 23:
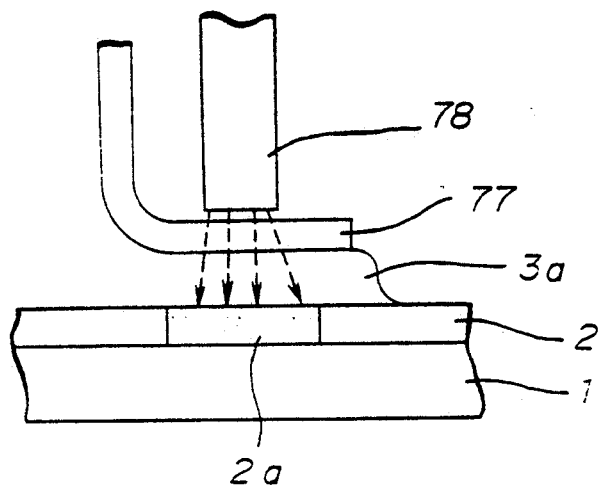
Figure 24:
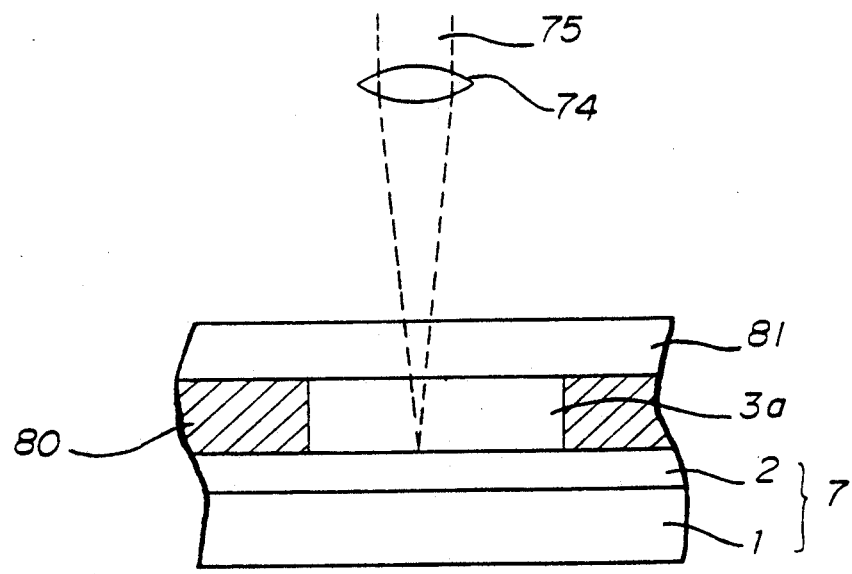

Third, an example of a recording apparatus, in which the recording medium is heated through a liquid such as ink, is shown in FIGS. 22 through 24.

Referring to FIG. 22, the recording material layer 2 is formed on the polyimide film 1 so that the recording medium 7 having the polyimide film 1 and the recording material layer 2 is formed. The liquid 3a such as ink is applied on the surface of the recording material layer 2. A light emitted from a laser unit 72 is irradiated, through a lens 74 and the liquid 3a, on the surface of the recording material layer 2. Thus, an area 2a of the recording material layer 2 on which the light is irradiated is heated so that the area 2a is changed into a hydrophilic area.

In this case, when the thickness of the liquid 3a is changed, the temperature in the area 2a, on which the light is irradiated, is changed, and then the amount of the ink adhered to the area 2a is changed. Thus, to form a stabilized image, it is necessary to make the thickness of the liquid 3a uniform.

A description will now be given of devices for making the thickness of the liquid 3a uniform.

In the recording apparatus as shown in FIG. 22, the liquid 3a is applied on the surface of the recording material layer 2 by use of a roller in which the liquid is impregnated.

In a recording apparatus as shown in FIG. 23, a gap controlling member 77 is provided over the recording material layer 2 of the recording medium 7 so that the gap controlling member 77 is separated from the surface of the recording material layer 2 at a predetermined distance. That is, a gap is formed between the gap controlling member 77 and the recording material layer 2. Then the liquid 3a is supplied into the gap. A thermal head 78 is provided on a surface of the gap controlling member 77 opposite to that surface in contact with the liquid 3a. According to the device as shown in FIG. 23, the thickness of the liquid 3a is uniform due to the gap between the gap controlling member 77 and the recording material layer 2.

In a recording apparatus as shown in FIG. 24, a plurality of separating blocks 80 are provided on the recording material layer 2 of the recording medium 7. The hight of each of the separating blocks 80 corresponds to a required thickness of the the liquid 3a. Each of the separating blocks 80 is positioned at an area where no image is formed. A resin film 81, such as a polycarbonate film, is supported on the separating blocks 80 so that the resin film 81 covers the recording medium 7. The liquid 3a is filled in a space formed between the resin film 81 and the recording medium 7. A laser beam 75 emitted from a laser unit irradiates, via a lens 74, the resin film 81 and the liquid 3a on the surface of the recording material layer 2. According to the mechanism as shown in FIG. 24, the thickness of the liquid 3a is uniform due to the space formed by the separating blocks 80 and the resin film.

It is possible to form another device, for making the thickness of the liquid adhered on the recording medium uniform, by the combination of parts of the device shown in FIGS. 22 through 24.

The proper thickness of the liquid is changed on the basis of the type of liquid, the viscosity of the liquid and the heat conductivity thereof. However, it is preferable that the thickness of the liquid be approximately between 1 um and 10 um.

A description will now be given of examples of experiments which were performed for forming an image.

The first experiment:

The recording material layer consists of a water and oil repellent agent "TG-702" or "TG-602". The recording material original liquid is diluted to double its volume by the freon TF (manufactured by MITSUI DUPONT FLUORO CHEMICAL CO., LTD.). And then, the diluted liquid was coated on a polyimide film (manufactured by TORAY-DUPONT CO., LTD.), and then dried at 90° C. for two hours. As a result, a recording material layer of 1 um was formed on the polyimide film. After that, a water-soluble ink (viscosity: 6 cp), in which a black acid dye was dissolved, was applied to the surface of the recording material layer 2 uniformly. The thickness of the water-soluble ink was 10 um.

In a first case, the thermal head heated, via the water-soluble ink, the recording material layer. In a second case, the thermal head heated, via the polyimide film, the recording material layer. The result of both the first case and the second case are indicated in table-1.

TABLE 1

| t | the first case *1 | the second case *2 |
|---|---|---|
| appx. 100 μm | 8 dot/mm printing good printing | 4 dot/mm printing pattern becomes thin |
| appx. 50 μm | 8 dot/mm printing good printing | 4 dot/mm printing pattern becomes thin |
| appx. 25 μm | 8 dot/mm printing good printing | 4 dot/mm printing good printing but 8 dot/mm printing pattern becomes thin | t is the thickness of the polyimide film
*1: 1 ms pulse driving
*2: 6 ms pulse driving Desirable printing image results were obtained in the first case where the thermal head heated the recording material layer via the water-soluble ink applied uniformly to the surface of the recording material layer.

The second experiment:

The recording material layer was formed on a polyimide film of 80 um under the same conditions as that of the first experiment. A dot image was formed by use of the mechanism shown in FIG. 24. In this mechanism, the thickness of the resin film 81 (a polycarbonate film) was approximately 20 μm, and the dot image was formed on the recording material layer 2 while the height of each separating block 80 (polycarbonate film) was changed. The relation between the condition of the formed dot image and the distance between the resin film 81 and the recording material layer corresponding to the thickness of the water-soluble ink is indicated in table-2.

TABLE 2

| d1 | d2 |
|---|---|
| appx. 20 μm | appx. 50 μm |
| appx. 50 μm | appx. 100 μm |
| appx. 100 μm | appx. 200 μm | d1: the distance between the resin film and the recording material layer
d2: the diameter of the dot image The following will be description of the recording agent.

In the recording method according to the present invention, obtaining the visible image on the surface of the recording medium 7 can be performed by the selective use of either writing ink, ink for ink jet printing, printing ink, electrostatic transfer toner or some other recording agent used in conventional printing processes.

Therefore, in the case of the specific example of water-soluble inks, it is possible to use water soluble inks containing water and humictants as the main components, water based pigment dispersal inks that have water, pigments, macromolecule compounds for dispersal and humictants as the main components, or emulsion inks in which pigments or dyes are the surface activated agents that are dispersed in water. The humictants used in water based inks can be any of the following water-soluble organic compounds:

Ethanol, methanol, propanol and other monovalent alcohols; ethylene glycol, diethylene glycol, triethylene glycol, tetraethylene glycol, polyethylene glycol, propylene glycol, dipropylene glycol, glycerine and other multivalent alcohols; ethylene glycol monomethyl esters, diethylene glycol monomethyl esters, triethylene glycol monomethyl esters, tetraethylene glycol monomethyl esters, propylene glycol monomethyl esters, ethylene glycol esters, diethylene glycol monomethyl esters, triethylene glycol monomethyl esters, tetraethylene glycol monomethyl esters, propyleneethylene glycol monomethyl esters and other monovalent alcohol esters; N-methyl-2-pyyrolidone, 1,3-dimethyl-imidazolricinon, ε-caprolactum and other heterocyclic compounds, monoethanol amine, diethanol amine, triethanol amine, monoethyl amine, diethyl amine, triethyl amine and other amines.

The water soluble pigment can be a pigment that is classified by the color index into acid pigments, direct pigments, chlorine group pigments, responsive pigments and food pigments.

C.I. acid yellow: 17, 23, 42, 79, 142
C.I. acid red: 1, 8, 13, 14, 18, 26, 27, 35, 37, 42, 52, 82, 87, 89, 92, 97, 106, 111, 114, 115, 134, 186, 249, 254, 289
C.I. acid blue: 9, 29, 45, 92, 249, 890
C.I. acid black: 1, 2, 7, 24, 26, 94
C.I. food yellow: 3, 4
C.I. food red: 7, 9, 14
C.I. food black: 2
C.I. direct yellow: 1, 12, 24, 26, 33, 44, 50, 142, 144, 865
C.I. direct red: 1, 4, 9, 13, 17, 20, 28, 31, 39, 80, 81, 83, 89, 225, 227
C.I. direct orange: 26, 29, 62, 102
C.I. direct blue: 1, 2, 6, 15, 22, 25, 71, 76, 79, 86, 87, 90, 98, 163, 165, 202
C.I. direct black: 19, 22, 32, 38, 51, 56, 71, 74, 75, 77, 154, 168

C.I. basic yellow: 1, 2, 11, 14, 14, 15, 19, 21, 23, 24, 25, 28, 29, 32, 36, 40, 41, 45, 49, 51, 53, 63, 65, 67, 70, 73, 77, 87, 91

C.I. basic red: 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112

C.I. basic blue: 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155

C.I. basic black: 2, 8 and the like.

The pigment can be an organic pigment such as azo pigments, phtalocyanine pigments, anthraquinone, pigments, quinacridon pigments, dioxazine pigments, indigo pigments, dioindigo pigments, perynone pigments, perylene pigments, iso-Indolenone pigments, aniline black, azomethine azo pigments, carbon black and others. The inorganic pigments can be iron oxide, titanium oxide, calcium carbonate, barium sulfate, ammonium hydroxide, barium yellow, prussian blue, cadmium red, chrome yellow and metal powder.

The dispersed pigment compounds can be polyacrylamide, polyacryrate and their alkali metallic salts, soluble styrene acrylic resins and their acryl family resins, soluble vinyl napthalene acid resins, polyvinyl pyrrolidone, polyvinyl alcohol, and its alkali salts, macromolecule compounds that include salts with cation functional groups such as ammonium and amino group etc., polyethylene oxides, gelatine, casein and other proteins, Arabia rubber, rubber and other natural rubbers, saponin and other glucoxyde, carboxy-methyl cellulose, hydroxyethyl cellulose, methyl cellulose and other cellulose inductors, lignin sulfonic acid and its salts, ceramics and other natural macromolecule compounds, and the like.

The oil-based type of recording agents, can as in the case of the water-based inks, be those in which a lipophilic pigment is dissolved in an organic compound, those in which a pigment is dispersed in an organic compound, those in which a pigment or colorant is emulsified in an oil base, and the like.

Representative examples of oil-based pigments are as follows.

C.I. solvent yellow: 1, 2, 3, 4, 5, 6, 7, 8, 9, 10, 11, 12, 14, 16, 17, 26, 27, 29, 30, 39, 40, 46, 49, 50, 51, 56, 61, 80, 86, 87, 89, 96

C.I. solvent orange: 12, 23, 31, 43, 51, 61

C.I. solvent red: 1, 2, 3, 16, 17, 18, 19, 20, 22, 24, 25, 26, 40, 52, 59, 60, 63, 67, 68, 121

C.I. solvent violet: 7, 16, 17

C.I. solvent blue: 2, 6, 11, 15, 20, 30, 31, 32, 36, 55, 58, 71, 72

C.I. solvent brown: 2, 10, 15, 21, 22

C.I. solvent black: 3, 10, 11, 12, 13

In addition, oil bases in which a pigment is dissolved or in which a pigment is dispersed include n-octane, n-decane, Milanese spirit, ligroin, naptha, benzene, toluene, xylene and other hydrocarbons; dibutyl ether, dihexylether, anisole, phenetole, dibenzyl ethers and other ethers; methanol, ethanol, isopropyl alcohol, benzyl alcohol, ethylene glycol, diethylene glycol, glycerine and other alcohols.

It is also possible to use the previously described pigments for the oil-based inks as well. Examples of oil-based pigment dispersal agents include polymethacrylate esters, polyacrylate esters, methacrylate ester-acrylate ester copolymers, ester cellulose, methyl cellulose and other cellulose resins, polyester, polyamide, phenol resins and other polymer resins, rosine, ceramics, gelatine, casein and other natural resins and the like.

A description will now be given of syntheses examples for the polymer and the copolymer used for the recording medium according to the present invention.

Synthesis 1—The polymerization of 1H,1H,2H,2H-heptadecafluorodecylmethacrylate:

50 g of 1,1,1-trichloroethane, 50 g of 1H,1H,2H,2H-heptadecafluorodecylmethacrylate (Viscoat 17FM manufactured by OSAKA ORGANIC CHEMICAL CO., LTD.) and 0.15 g of 2,2'-azobis(isobutyronitrile) were put into a 3-necked flask having a thermometer, and then a mixture of these ingredients was stirred for 30 minutes so that nitrogen substitution was performed. After that, polymerization was performed at 70° C. for 5 hours in the mixture while the mixture was stirred in a condition of flowing nitrogen gas. As a result, white colored mucilage was obtained. The white colored mucilage was put into 100 ml of methanol and stirred, and then white colored solid material was separated from the mucilage. The white colored solid material was reduced to powder by use of a mortar. The powder was washed by 100 ml of methanol, and then the washed powder was dried in a condition of reduced pressure so that 47.5 g of the product was obtained. In this case, the yield was 95%.

Synthesis 2—The polymerization of 1H,1H,2H,2H-heptadecafluorodecylacrylate:

1H,1H,2H,2H-heptadecafluorodecylacrylate was substituted for 1H,1H,2H,2H-heptadecafluorodecylmethacrylate, and the process used in this "Synthesis 2" is the same as that used in the "Synthesis 1" so that the product is obtained.

Synthesis 3—The copolymerization of 1H,1H,2H,2H-heptadecafluorodecylmethacrylate and stearyl methacrylate (SMA):

82 g of 1,1,1-trichloroethan, 50 g of 1H,1H,2H,2H-heptadecafluorodecylmethacrylate (Viscoat 17FM manufactured by OSAKA ORGANIC CHEMICAL CO., LTD.), 31.9 g of SMA which can be obtained on the market and 0.3 g of AIBN (2,2'-azobis(isobutyronitrile)) were put into the 3-necked flask having the thermometer, and then the mixture of these ingredients was stirred for 30 minutes so that nitrogen substitution was performed. Polymerization was performed at 70° C. for 5 hours while the mixture was stirred in a condition of flowing nitrogen gas. As a result, mucilage which was swelled on 1,1,1-trichloroethan was obtained. The reaction liquid in the 3-necked flask was dissolved by hexane and the solution was precipitated in methanol so that the reaction liquid was refined. In addition, the precipitated material was dried at a temperature between 100° C. and 120° C. in a condition of reduced pressure so that 78 g of the product was obtained. In this case the yield was 63%.

Syntheses 4 through 7

The copolymer was synthesized by use of 1H,1H,2H,2H-heptadecafluorodecylmethacrylate (17FM) and SMA which were mixed in a ratio indicated in the following table-3.

TABLE 3

| Synthesis | 17FM SMA |
|---|---|
| 4 | 1:9 |
| 5 | 3:7 |
| 6 | 7:3 |

TABLE 3-continued

| Synthesis | 17FM SMA |
|---|---|
| 7 | 9:1 |

Condition of Synthesis:
Initiator/Monomer = $10^{-2}$ (mol)
Monomer/Solvent = 1/1 (weight)
Solvent: 1,1,1-trichloroethan
Initiator: AIBN 2,2'-azobis(isobutyronitrile)

In syntheses 4 through 6, the good solvent is hexane and the poor solvent is methanol. In synthesis 7, the good solvent is fluoride-containing solvent of freon TF manufactured by MITSUI-DUPONT CO., LTD. and the poor solvent is methanol.

Synthesis 8 The polymerization of N-ethyl-perfluorooctanesulfonyl-3-aminoethaneslufonic acid vinyl ester:

1.5 g of $CH_2=CHOCOCH_2N(C_2H_5)SO_2C_8F_{17}$ and 0.015 g of acetyl peroxide were dissolved by 0.060 g of dimethylterephthalate solvent in an ample tube. Oxygen was removed from the ample tube, and then vinyl ester monomer was melted by warming in the solution put in the ample tube. After that, the ample tube was frozen by use of liquid oxygen, and the ample tube was sealed in a condition of reduced pressure of less than 0.1 mmHg. The reaction was performed for 15.5 hours in the ample tube put in a water bath at 60° C. After 15.5 hours of agitation, internal material was dissolved in xylenehexafluoride, and then the solution was put into an excessive amount of methanol so that the polymer was settled. The solution including the polymer was filtered. Then the polymer was dried in the condition of reduced pressure at room temperature so that 0.95 g of the product polymer was obtained. In this example of synthesis, the yield was 64%, and the softening temperature was 70° C.

Synthesis 9—The polymerization of 2-(perfluoro-7-methyloctyl)ethyl thiolmethacrylate:

2.5 g of 2-(perfluoro-7-methyloctyl)ethyl thiolmethacrylate was dissolved in 1.6 g of acetone, and then the solution was put into a flask. In addition, 0.1 g of 60% methyloleamide, 7.5 g of water eliminated oxygen, 0.12 g of $[C_{16}H_{32}N(CH)_3]^+Br^-$ and 0.05 g of 2,2'-azodiisobutyramidine dihydrochloride were also put into the flask. The flask was filled with nitrogen gas, and then the flask was put into a thermostat so that the reaction was performed at 70° C. for 4 hours. As a result, latex polymer was obtained.

Synthesis 10—The polymerization of vinyl1,1-dihydroperfluorobtylether:

The polymerization characteristic of this ether product was demonstrated by placing 0.45 g thereof and 0.005 g of a 2% solution of boron trifluoride/ethyl ether complex in diethyl ether solvent, in a glass ampoule which was sealed with a rubber stopper and allowed to stand for 24 hours at 25° C.

EXAMPLES

Example 1

The film material (the material of the surface of the recording medium (A)) is a water and oil repellent agent "TG-702" or "TG-602" manufactured by the DAIKIN MANUFACTURING CO., LTD. and is an acrylate material that includes flourine. This material source liquid was diluted to double the volume using freon TF (manufactured by MITSUI FLUORO CHEMICAL CO., LTD.). After this, it was coated onto a polyimide film (manufactured by the TORAY-DUPONT CO., LTD. 200V) and then dried at 90° C. for two hours to make a film of approximately 1 μm thickness. After this, as shown in FIG. 3A, in the status where the surface of the film 2 was in contact with a liquid 3 (pure water), heating was performed from the side of the polyimide film 1 by a ceramic heater 4 (heating temperature 120° C., time: approximately 1 sec). Prior to and after this heating, a remarkable lowering of the receding contact angle of the surface of the film 2 due to the pure water was observed for the material (surface energy: approximately: 10 dyn/cm). This is to say that the surface of the film 2 had the water adhered to it. Furthermore, when the film 2 was left in this state, the liquid adhesiveness was maintained.

Figure 25:
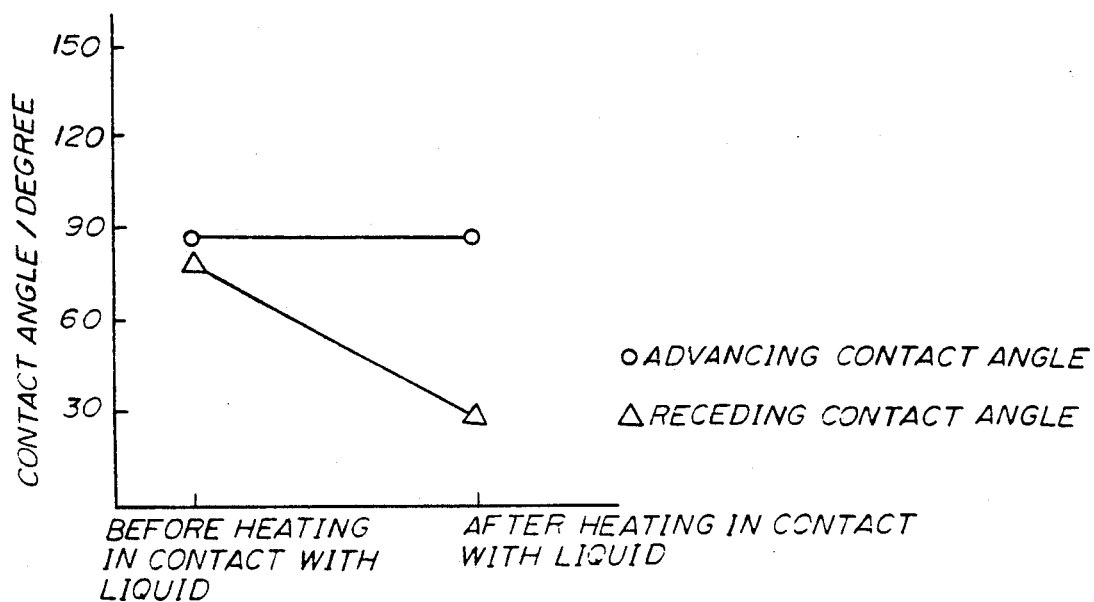
FIGS. 25 and 26 are views indicating the changes in the advancing contact angle and the receding contact angle in the surface of the recording medium.
Figure 26:
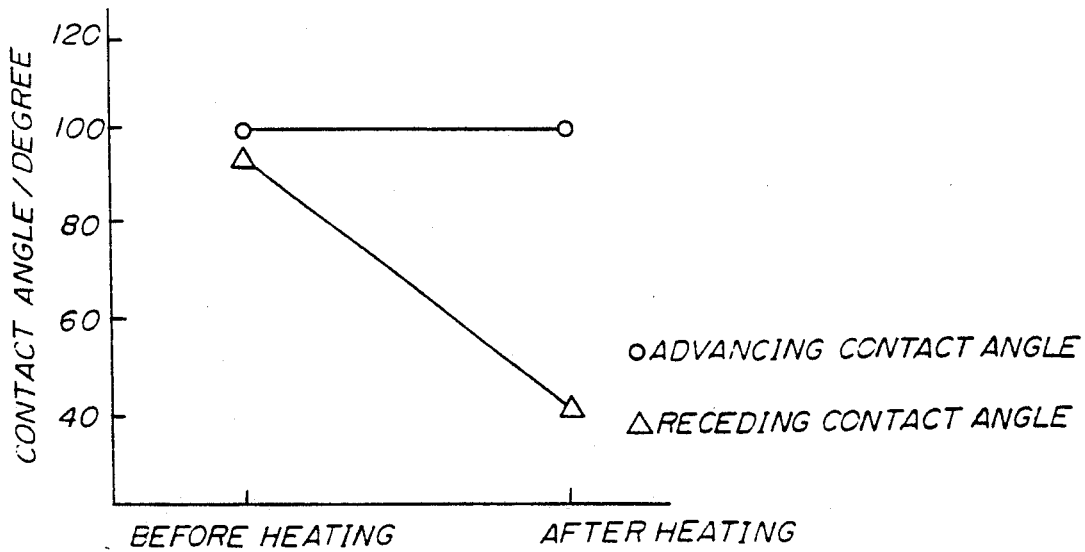

Moreover, the same effect was observed when instead of pure water, n-nonane, m-xylene or another non-polar liquid, or an-butanol or another polar liquid was used. Moreover, the contact angle in the case where n-butanol or m-xylene was used was measured as indicated in FIGS. 25 and 26.

Example 2

The film material (the material of the surface of the recording medium (A)) is a water and oil repellent agent "FURORAD FC-720" manufactured by the SUMITOMO-3M and is an acrylate material that includes flourine. This water and oil repellent agent was coated to a polyimide film (manufactured by the TORAY-DUPONT CO., LTD.; 500H) and then dried at 90° C. for two hours to make a film of approximately 3 μm thickness. After this, as shown in FIG. 13, this film was made into a roll and wrapped around an aluminum cylinder with a diameter of 100 mm and a length of 100 mm to make a recording medium A. A heating portion of a thermal head for a thermal transfer printer was placed so as to be in contact with the film. Furthermore, this thermal head was also placed in the ink receptacle vat so that it was in contact with the recording ink. The material that was used as the liquid ink was a cyan ink of the phthalocyanine type (with a dye concentration of 1 wt %, and the solvent being concentrated 0.05 mol. NaOH water solution).

When the suitable electric signals of image information were sent to the thermal head to perform heating, the ink adhered only to those portions that were heated. Furthermore, as is indicated in FIG. 13, when recording paper 61 (manufactured by the MITSUBISHI PAPER MANUFACTURING CO., LTD. NM coated paper) was conveyed so as to be in contact with the cylindrical recording medium, the ink was transferred to the paper. After this step the portion of the recording medium A in which the ink was transferred exhibited adhesion of the ink when it was left in that state. This recording apparatus therefore functioned as a printing apparatus.

Example 3

The manufacture of the film 2 on a polyimide substrate was performed for the same conditions as for Example 1. Furthermore, in the same manner as Example 1, heating was performed when the liquid was in the status of contact and the surface of the film 2 exhibited liquid adhesiveness. As indicated in FIG. 14A, this film which exhibited liquid adhesiveness, and the surface of the recording medium (A) was heated in air, by an infra-red lamp to a temperature of approximately 130° C. for a period of approximately 1 sec. As is indicated in FIG. 4, it was obserbed that the receding contact angle was decreased due to the heating the recording medium (A) in the status of contact with the liquid, and then returned to an angle before heating in the status of contact with the liquid by heating the recording medium in air. This is to say that the liquid repellency has ben reversed. It was confirmed that image information could be recorded and erased from the results of this series of operations.

Example 4

After the operations described for Example 2 has been performed, a ceramic heater was used to perform uniform heating in air to erase the pattern for which the ink had adhered. In this manner, it was possible to print the various character information on an A4 size recording paper.

Example 5

A polycarbonate film (2 cm×2 cm×100 cm) was used as the substrate. The material used for the film 2 was the "Dyefree MS-443" or "Dyefree MS-743" manufactured by the DAIKIN MANUFACTURING CO., LTD. This base liquid was mixed with carbon black (ASTM name: N330) at a proportion of 0.5 wt % and this mixed liquid was cast to a polycarbonate film to manufacture a film having a thickness of approximately 10 $\mu$m. The surface energy of this film 2 was measured at approximately 20–30 dyn/cm. The source for the electromagnetic waves was a semiconductor laser (manufactured by MATSUSHITA ELECTRICAL MFG. CO., LTD.: LN9850, 50MW). The material that was used as the liquid ink was a cyan ink of the phthalocyanine type (solvent: 0.05 mol. NaOH water solution). This ink was coated at the entire surface of the film 2 and the laser light that was focussed through a lens was irradiated from the side of the polycarbonate film. Then, when the ink had been removed, it was confirmed that the ink had adhered to only those portions of the film 2 to which the laser light had been irradiated.

Example 6

After the operations of Example 1 had been performed, the adhered ink (recording agent) was removed by water washing. After this, the surface of the film 2 was dried and a laser beam from a semiconductor laser was again irradiated to those portions, in air. After several seconds, ink was applied once again to the surface of the film 2 and, there was no more ink adhesion to those portions which had been irradiated. This is to say that it was confirmed that the image information had been erased.

Example 7

The material that was used as the surface of the recording medium (A) was a monomer "Viscoat 17F" manufactured by OSAKA ORGANIC CHEMICAL CO., LTD. and after solution polymerization had been performed, in accordance with the example of systhesis 7, using 1-1-1 trichloroethan liquid, was uses as the polymer. In addition, 0.2 mm aluminum foil was used as the substrate and the polyimide layer was spin coated onto this aluminum foil. On top of this polyimide layer was coated the solution of the material for the surface of the recording medium (A) after it had been diluted double, drying at 90° C. was performed for two hours and a film of approximately 1 $\mu$m was manufactured (to have a surface energy of approximately 10 dyn/cm). Pure water was placed on top of this film 2 and heating by a thermal printer for thermal transfer was performed from the side of the substrate. Measurements of the receding contact angle of the surface of the recording medium before and after the heating showed that when compared to Example 2, it was possible to achieve a remarkable reduction in the receding contact angle for a heating time shorter by a factor of ten. The surface of the film 2 showed clear liquid adhesion.

Example 8

To one surface of a polyimide sample with a thickness of approximately 50 $\mu$m and having sides of approximately 50, 75, 100 and 15 $\mu$m was formed an aluminum pattern having a height of approximately 50 $\mu$m and at a pitch of 200 dpi in the direction of the scan of electric signal. After this, the same processing as described for the Example 1 was used to form a film 2 of a recording medium A on the surface opposite the surface with the pattern. Ink liquid was placed on this surface and the surface was brought into contact with a thermal head for a 200 dpi thermal transfer printer with approximately 100 $\mu$m×200 $\mu$m heat pixels and heating was performed. After heating, the status of adhesion of ink to the film 2 was observed under a microscope and in the case of a pattern of approximately 150 $\mu$m square, it was observed that there was a practically continuous application of ink despite the fact that the non-heated portions between the patterns were only approximately 100 $\mu$m. This can be interpreted as meaning that in the processes of the heat being dispersed into the surface of the recording medium (A) and the polyimide film from the heated aluminum pattern, there was heat dispersal in the direction of the primary scan. In the case of a pattern of approximately 75 $\mu$m square, the size of the liquid adhesion portion was the degree of the heating element.

Example 9

Figure 27:
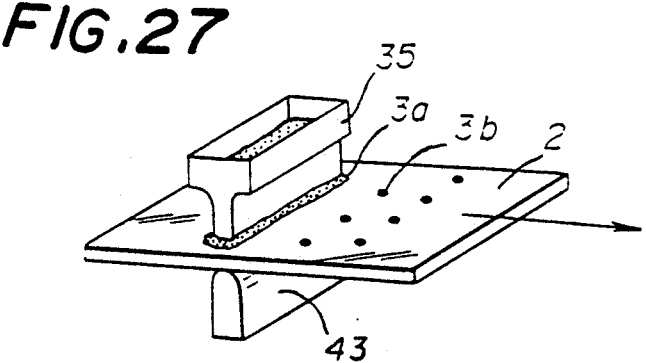
FIG. 27 is a view describing another embodiment of an apparatus that performs image formation in accordance with the image recording method of the present invention.

The recording medium (A) used was a film to which the film 2 manufactured in accordance with Example 1 was coated. As is indicated in FIG. 27, an ink supply portion is provided on the film 2 and on the film immediately beneath it is disposed a thermal head in contact with the film. The liquid 3a is an ink using an n-octane as the liquid ink and carbon black as the pigment.

The film is moved in the direction indicated by the arrow while the thermal head is being driven in accordance with the image information. The ink 3b adheres to the film 2 in accordance with the image information and functions as a recording medium (A).

Furthermore, after this adhered ink 3b has been transferred to the recording paper 61, the ink adhesiveness of the film 2 is maintained. Stil furthermore, when the film 2 heated in air, the ink adhesiveness is removed.

An ink that uses carbon black as the pigment and benzene as the solvent and an ink that uses methyl isobutyl ketone as the solvent will also produce the same results as above.

Example 10

A acrylate ester copolymer having a perfluoroalkyl group having many hydroxl functional groups (and manufactured by MITSUBISHI RAYON CO., LTD. "AR-989") was used. This source liquid was diluted to double by using xylene and 90 mg of toluene disocyanate was used as the crosslinking agent with respect to 3 g of the diluted liquid and dried. A glass plate was used for substrate of the recording medium (A). After this, heating at 110° C. was performed for one hour. The manufactured film 2 had its surface energy measured at 30-40 dyn/cm.

Figure 28:
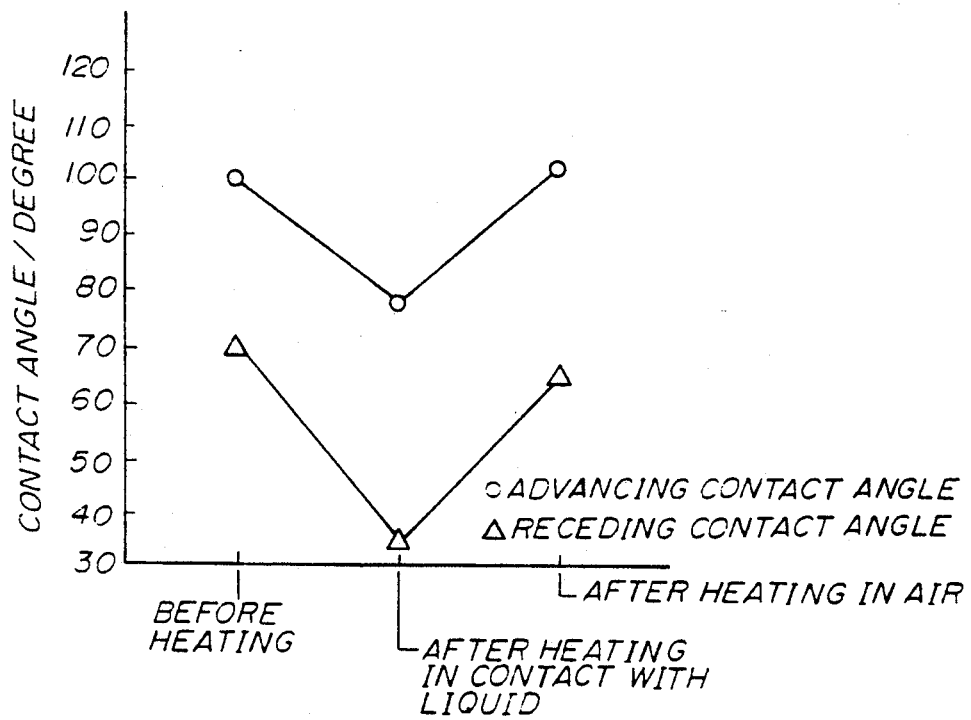
FIG. 28 is a view indicating the changes in the advancing contact angle and the receding contact angle in the surface of the recording medium.

After this film with a thickness of approximately 10 μm was brought into contact with the liquid and heated (at 100° C. for one sec.), the fluctuations in the contact angle for before and after the heating, and the fluctuations of the contact angle for the pure water for when there was further heating in air (at 120° C. for 1 sec.) are shown in FIG. 28. As is indicated in FIG. 28, the heating in the liquid and in the air shows that the water repellency and the liquid adhesiveness of the liquid on the surface of the recording medium (A) change so as to reverse. Then, plain paper for photocopying was used with a pressure of 20 gf and no marks or scratches were observed when the surface of the film 2 was rubbed.

Example 11

Figure 29:
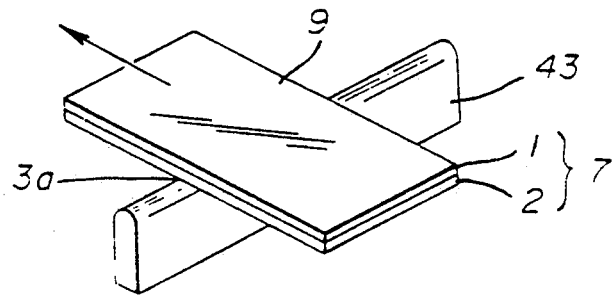
FIG. 29 is a view describing yet another embodiment of an apparatus that performs image formation in accordance with the image recording method of the present invention.

A recording medium 7 created under the same conditions as for the Example 10 was used an printing performed as indicated in FIG. 29. A thermal head 43 was used as the heat source. Water soluble ink 3a was dropped onto the recording medium and the surface of the film 2 was brought into contact with the recording medium. When the image signals were impressed to the thermal head 43, and heat was applied via the water soluble ink 3a to the surface of the recording medium (A), the ink was made to adhere to the surface of the film 2.

Example 12

The material for the film 2 was a copolymer manufactured by , in accordance with the example of synthesis 1, perfluoromethyl methacrylate monomer methyl metacrylate monomer ("Viscose 17F" manufactured by OSAKA ORGANIC MANUFACTURING CO., LTD.) in 1-1-1 trichloroethan liquid. This was then dissolved in freon 113 and a 7 wt. % coating liquid produced. This coating liquid was then cast on a polycarbonate plate with a thickness of 1 mm and drying performed to form the recording medium. The surface energy of the film 2 of the recording medium was measured at approximately 10 dyn/cm. This recording medium was then heated by a thermal head, using the apparatus indicated in FIG. 10, in accordance with image signals and then dried using an infra-red lamp. The ink used was a water-soluble ink using a black acid dye.

Example 13

The material for the film 2 was a copolymer manufactured by perfluoroalkyl methacrylate monomer methyl metacrylate monomer ("Viscoat 17F" manufactured by OSAKA ORGANIC CHEMICAL CO., LTD.) and methyl metacrylate monomer in a 1:1 mole ratio. The recording medium was formed of this material (having a surface energy of approximately 10-20 dyn/cm) in the same manner as the Example 1. This recording medium was evaluated as having favorable functions.

Example 14

A copolymer was obtained by a solution polymerization using an n-butyl metacrylate monomer. This material (with a surface energy of approximately 30-40 dyn/cm) was brought into contact with pure water in the same manner as for Example 1 and heated to more than 180° C. and consequently exhibited liquid adhesiveness.

Example 15

A polished platinum plate was used as the substrate for the recording medium. This platinum plate was preheated to 60° C. and a solid $CF_3(CF_2)_6COOH$ (solid at 25° C.) was placed upon it. Ten minutes later, the melted $CF_3(CF_3)_6COOH$ was taken off by a platinum wire to form the above compound in a single molecular layer (film 2) on the platinum. After formation of the film, the receding contact angle of the surface of the recording medium (A) for n-octane was approximately 60°. This recording medium (A) was heated to 80° C. when in contact with n-butane. The contact angle became approximately 40° and the recording medium (A) exhibited adhesiveness with respect to he n-octane.

Furthermore, after the n-octane had been removed, the above described recording medium (A) was heated in air to 80° C. for one second and after cooling, the receding contact angle with respect to the n-octane was approximately 60°.

Example 16

Poly (perfluoro octhyl carbamoyl methacrylate) was used as the compound that exhibits self-surface orientation. Perfluoro octhyl carbamoyl methacrylate was used as the monomer.

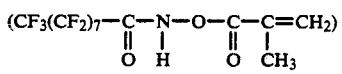

This was heated in ethyl acetate ester to 80° C. for 15 hours and agitated to manufacture the polymer described above and the resulting substance was purified by monomer resedimentation.

This polymer was dissolved in a mixed liquid of benzotriflouride:hexaflouroxylene:ethyl acetate in a 1:1:1 mixture and this liquid (the liquid forming the film 2) was cast on a polyimide film, heated to 100° C. for 90 minutes to dry it and create the recording medium (A). This was then brought into contact with pure water and heated in the same manner as Example 1. Water soluble ink adhered to the heated portions.

Furthermore, after the ink was removed, the surface of the recording medium (A) was heated to 130° C. for 10 seconds and the recording medium (A) exhibited water repellency.

Example 17

Vinyl n-heptafluorobutyrate

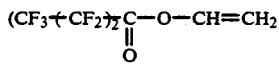

was used as the monomer. 2 g of this monomer and 0.08 g of acetyl peroxide (25% liquid) were heated together with dimethyl phthalate and agitated at 45° C. for 15 hours to manufacture a polymer. This was extended in the direction of the molecules to freate a film which was then used as the recording medium (A) itself. As in Example 1, this recording medium (A) was then heated through a water-based ink in accordance with image signals. There was some adhesion of ink to he heated portions.

Example 18

The polymer synthesized in syntheses examples 3 through 7 was coated on the base member made of polyimide so that the polymer film was formed on the surface of the base member. The polymer film was formed in the same condition as that in Example 1.

The polymer film was heated in the condition where the liquid was in contact with the polymer film so that the surface of the polymer film with which the liquid was in contact became an area which was hydrophilic. After that, the polymer film was, as shown in FIG. 14A, heated by an infrared lamp 41 at 130° C. for approximately 1 second in air. In this process, the receding angle for the liquid on the polymer film was changed, as shown in FIG. 4. That is, when the polymer film was heated in the condition where the liquid was in contact with the polymer film, the receding angle decreased, and after that, when the polymer film was heated in air, the receding angle returned to the original receding angle. Due to this process, it is possible to record an image and to eliminate the image.

Example 19

The polymer synthesized in the synthesis example 8 was dissolved in xylenehexafluoride, and the solution was coated on the base member so that the polymer film was formed on the base member. After the process was performed in the same manner as that in Example 2, a ceramic heater uniformly heated the polymer film. As a result, the area on which the ink was adhered was eliminated.

Example 20

The latex solution of the polymer synthesized in the synthesis example 9 was coated on the acrylic resin plate so that a polymer film, whose thickness was approximately 10 um, was formed on the acrylic resin plate. The liquid ink was phtalocyanine type cyanogen ink (solution: density 0.5 mol of NaOH aqueous solution). The liquid ink was applied on the polymer film, and then a laser beam emitted from the laser unit (LN 9850 50mw manufactured by MATSUSHITA ELECTRIC CO., LTD.) irradiated the acrylic resin plate so that the polymer film was heated. As a result, when the ink was eliminated, only the ink adhered on an area on which the laser beam irradiated remained.

Example 21

The polymer synthesized in the synthesis example 10 was dissolved in diethylether, and then the polymer film was coated on the base member. After the process was performed in the same manner as that in Example 1, the ink adhered on the polymer film was washed in water. The surface of the polymer film was dried, and then the laser beam irradiated the area in air. As a result, no ink was adhered on the area where the laser beam irradiated. That is, recording information was eliminated.

Comparison Example 1

Perfluoro methyl metacylate monomer which has a carbon number of 2 ("Viscoat 3FM: manufactured by OSAKA ORGANIC CHEMICAL CO., LTD.) was used and the processes described in Example 12 were performed but the functions of a recording medium were not exhibited.

Comparison Example 2

A copolymer using a methyl metacrylate monomer was manufactured and the processes described in Example 1 were performed to create the recording medium (A) for a second comparison. After the recording medium was brought into contact with the liquid heated to 200° C. and heated, there was still no change for the contact angle for before and after the surface of the recording medium was heated.

Comparison Example 3

Polystyrene and polycarbonate that are materials that do not have alkyl functional groups were used for the same processes as in Example 1 to manufacture a recording medium (A) for comparison, and evaluated. There was no change in the receding contact angle for before and after heating in the state of contact with the liquid.

Comparison Example 4

A copolymer of vinyl alcohol and methyl metacylate monomer ("Viscoat 17F" manufactured by OSAKA ORGANIC CHEMICAL CO., LTD.) was formed on a support substrate to create the recording medium (A). The film 2 had a surface energy of 55 dyn/cm. This film 2 was brought into contact with a water-soluble ink ($\gamma=45$ dyn/cm.) and then there was ink adhesiveness for the entire surface.

What is claimed is:

1. A recording process comprising in an arbitrary order the following steps (a) and (b) of:
    (a) bringing a contact material into contact with a surface of a recording medium, said surface having a characteristic in which a receding contact angle decreases when said recording medium is heated in a condition where said recording medium is in contact with a liquid, said contact material being selected from a liquid, a vapor and a solid which generates or changes to either a vapor or a liquid under condition of a temperature lower than a temperature at which the recording angle on said recording medium starts to decrease, and
    (b) selectively heating said surface of said recording medium in accordance with image information, wherein an area having the receding contact angle corresponding to a temperature on said recording medium obtained by selecting heating said surface of said recording medium in accordance with the image information is formed, as a latent image, on said surface of said recording medium.

2. A recording process as claimed in claim 1, wherein said step (a) precedes said step (b).

3. A recording process as claimed in claim 1, wherein said step (b) precedes said step (a).

4. A recording process as claimed in claim 1 further comprising steps of removing said contact material from said surface of said recording medium and heating said surface of said recording medium, so as to erase said latent image.

5. A recording process as claimed in claim 1 further comprising a step of supplying a recording agent which includes a colorant, to said surface of said recording medium upon which the latent image has been formed, so as to color said latent image by said colorant.

6. A recording process as claimed in claim 5 further comprising a step of fixing a visible image developed by said recording agent on said surface of said recording medium, to said surface of said recording medium.

7. A recording process as claimed in claim 5 further comprising steps of transferring a visible image developed by said recording agent on said surface of said recording medium, to a medium for image transfer and fixing said visible image which is transferred to said medium for image transfer, on a surface of said medium for image transfer.

8. The recording process of claim 1, wherein said recording medium comprises:
a base member; and
a recording layer, provided on said base member, having a characteristic in which a receding contact angle decreases when said recording layer is heated in a condition where said recording layer is in contact with a liquid, said recording layer has an organic compound which includes a hydrophobic group, said hydrophobic group having a nature whereby it is oriented to a side open to air when said recording layer is heated in air.

9. The recording process of claim 8, wherein said organic compound has a chain molecular structure which has a plurality chains, said chain molecules including an alkylene group having a carbon number which is equal to or greater than 4, and a surface energy of said organic compound being equal to or less than 50 dyn/cm.

10. The recording process of claim 8, wherein said organic compound has a chain molecular structure which has a plurality of chains, hydrophobic group being provided at ends of said chains, said chain molecules including an alkylene group having a fluorine substituted for at least one hydrogen of said alkylene group and having a carbon number which is equal to or greater than 4, and a surface energy of said organic compound being equal to or less than 50 dyn/cm.

11. The recording process of claim 8, wherein said organic compound includes an alkyl group having a carbon number which is equal to or greater than 4, and a surface energy of said organic compound being equal to or less than 50 dyn/cm.

12. The recording process of claim 8, wherein said organic compound includes an alkyl group having a fluorine substituted for at least one hydrogen of said alkyl group and having a carbon number which is equal to or greater than 4, and a surface energy of said organic compound being equal to or less than 50 dyn/cm.

13. The recording process of claim 8, wherein said organic compound includes an alkyl group having a chloride substituted for at least one hydrogen of said alkyl group having a carbon number which is equal to or greater than 4, and a surface energy of said compound being equal to or less than 50 dyn/cm.

14. The recording process of claim 8, wherein said organic compound includes an alkyl group having a chlorine and a fluorine substituted for at least two hydrogens of said alkyl group and having a carbon number which is equal to or greater than 4, and a surface energy of said organic compound being equal to or less than 50 dyn/cm.

15. The recording process of claim 8, wherein said base member has a porous member, and said recording member is kept in said porous member so that the recording member is exposed on a surface of the porous member.

16. The recording process of claim 8, wherein said base member has a rough surface, and said recording member is provided on said rough surface of said base member.

17. The recording process of claim 1, wherein said recording medium comprises:
a base member; and
a recording layer, supported by said base member, having a characteristic in which a receding contact angle decreases when said recording layer is heated in a condition where said recording layer is in contact with a liquid, said recording layer containing a compound which has side chains having alkyl group that has a carbon number of 4 or more.

18. The recording process of claim 17, wherein said compound is a polymer of a compound represented by the following general formula (I):

wherein, $R^1$ is either hydrogen, $-CH_3$ group or $-C_2H_5$ group and
$R^2$ is $-(CH_2)_nCH_3$ (where $n \geq 3$).

19. The recording process of claim 17, wherein said compound is a polymer of a compound represented by the following general formula (II):

wherein, $R^1$ is either hydrogen, $-CH_3$ group or $C_2H_5$ group, and
$R^6$ is $-(CH_2)_nCH_3$ (where $n \geq 3$).

20. The recording process of claim 17, wherein said compound is a polymer of a compound represented by the following general formula (III):

wherein, $R^1$ is either hydrogen, $-CH_3$ group or $C_2H_5$ group and
$R^{11}$ is $-(CH_2)_nCH_3$ (where $n \geq 3$).

21. The recording process of claim 17, wherein said compound is a polymer of a compound represented by the following general formula (IV):

wherein, $R^1$ is either hydrogen, $-CH_3$ group or $C_2H_5$ group and
$R^{13}$ is $-(CH_2)_nCH_3$ (where $n \geq 3$).

22. The recording process of claim 17, wherein said compound is a polymer of a compound represented by the following general formula (V):

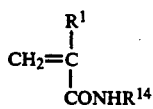
(V)

wherein, $R^1$ is either hydrogen, —$CH_3$ group or $C_2H_5$ group and
$R^{14}$ is —$(CH_2)_nCH_3$ (where $n \geq 3$).

23. The recording process of claim 17, wherein said base member has a porous member, and that recording member is kept in said porous member so that the recording member is exposed on a surface of the porous member.

24. The recording process of claim 17, wherein said base member has a rough surface, and said recording member is provided on said rough surface of said base member.

25. The recording process of claim 1, wherein said recording medium comprises:
a base member; and
a recording layer, supported by said base member, having a characteristic in which receding contact angle decreases when said recording layer is heated in a condition where said recording layer is in contact with a liquid, said recording layer containing a compound which has side chains having fluorine.

26. The recording process of claim 25, wherein said compound is a polymer of a compound represented by the following general formula (I):

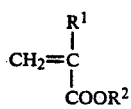
(I)

wherein $R^1$ is either hydrogen or —$CH_3$ group, and $R^2$ is either —$(CH_2)_nR^3$ where n is an integer in a range between 1 and 10, $R^3$ is linear chain or branching perfluoroalkyl group in which a carbon number is between 3 and 21,

—$CH_2CF_2CHFCF_3$,

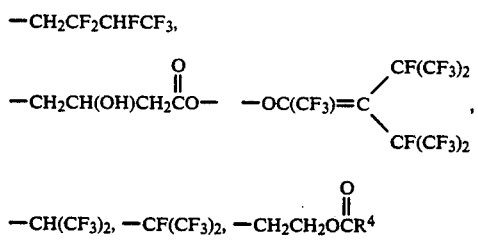

—$CH(CF_3)_2$, —$CF(CF_3)_2$, —$CH_2CH_2OCR^4$ where $R^4$ is linear chain of branching perfluoroalkyl group,

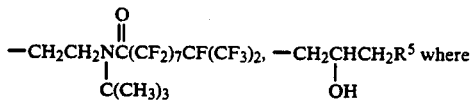

$R^5$ is linear chain or branching perfluoroalkyl group in which a carbon number is between 1 and 8, or —$CH[CH_2OCF(CF_3)_2]_2$.

27. The recording process according to claim 25, wherein said compound is a polymer of a compound represented by the following general formula (II):

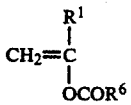
(II)

wherein, $R^1$ is either hydrogen or —$CH_3$ group, and $R^6$ is either —$(CF_2)_nF$ where n is equal to 1 or an integer in a range between 3 and 17, —$(CH_2)_nR^7$ where n is an integer in a range between 1 and 10 and $R^7$ is linear chain of branching perfluoroalkyl group, or —$R^8N(R^9)SO_2R^{10}$ where $R^8$ is alkylene group in which a carbon number is between 1 and 12, $R^9$ is either hydrogen or normal or branching alkyl group in which a carbon number is between 1 and 6, and $R^{10}$ is linear chain of branching perfluoroalkyl group in which a carbon number is between 4 and 12.

28. The recording process of claim 25, wherein said compound is a polymer of a compound represented by the following general formula (III):

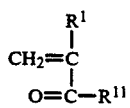
(III)

wherein, $R^1$ is either hydrogen or —$CH_3$ group, and $R^{11}$ is either

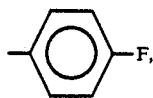

—$SCH_2CH_2R^{12}$ where $R^{12}$ is normal or branching perfluoroalkyl group in which a carbon number is between 5 and 13, or $CH_2F$.

29. The recording process of claim 25, wherein said compound is a polymer of a compound represented by the following general formula (IV):

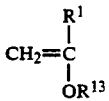
(IV)

wherein,
$R^1$ is either hydrogen or —$CH_3$ group, and $R^{13}$ is either

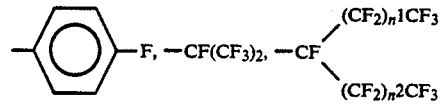

where $n^1$ and $n^2$ are respectively integers in a range between 0 and 10, —$CF[CF(CF_3)_2]_2$,

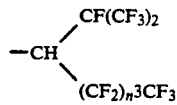

where $n^3$ is an integer in range between 0 and 18,

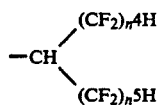

where $n^4$ and $n^5$ are respectively integers in a range between 1 and 18,

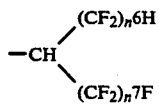

where $n^6$ and $n^7$ are respectively integers in a range between 1 and 18, or

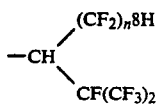

where $n^8$ is an integer in a range between 1 and 18.

30. The recording process of claim 25, wherein said compound is a polymer of a compound represented by the following general formula (V):

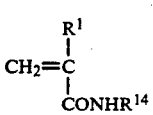 (V)

wherein, $R^1$ is either hydrogen or —CH$_3$ group, and $R^{14}$ is either —CH$_2$CF$_2$H, —CH$_2$CF$_2$CH$_3$, —CHCF$_3$, —(CH$_2$)$_3$CF$_3$, or —(CH$_2$CF$_2$H)$_2$.

31. The recording process according to claim 25, wherein said compound is a copolymer containing at least one of compounds represented by the following general formulas (I), (II), (III), (IV) and (V):

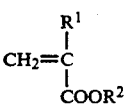 (I)

wherein $R^1$ is either hydrogen or —CH3 group, and $R^2$ is either —(CH$_2$)$_n$R$^3$ where n is an integer in a range between 1 and 10, $R^3$ is linear chain or branching perfluoroalkyl group in which a carbon number is between 3 and 21,

—CH$_2$CF$_2$CHFCF$_3$,

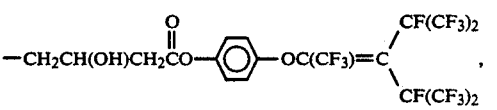

—CH(CF$_3$)$_2$, —CF(CF$_3$)$_2$, —CH$_2$CH$_2$OCR$^4$ where $R^4$ is linear chain of branching perfluoroalkyl group,

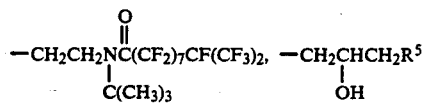

where $R^5$ is a linear chain or branching perfluoroalkyl group in which a carbon number is between 1 and 8, or —CH[CH$_2$OCF(CF$_3$)$_2$]$_2$,

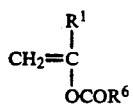 (II)

wherein, $R^1$ is either hydrogen or —CH$_3$ group, and $R^6$ is either —(CF$_2$)$_n$F where n is equal to 1 or an integer in a range between 3 and 17, —(CH$_2$)$_n$R$^7$ where n is an integer in a range between 1 and 10 and $R^7$ is linear chain or branching perfluoroalkyl group, or $R^8$N($R^9$)SO$_2$R$^{10}$ where $R^8$ is alkylene group in which a carbon number is between 1 and 12, $R^9$ is either hydrogen or normal or branching alkyl group in which a carbon number is between 1 and 6, and $R^{10}$ is a linear chain of branching perfluoroalkyl group in which a carbon number is between 4 and 12,

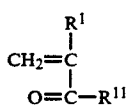 (III)

wherein, $R^1$ is either hydrogen or —CH$_3$ group, and $R^{11}$ is either

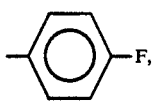

—SCH$_2$CH$_2$R$^{12}$ where $R^{12}$ is normal or branching perfluoroalkyl group in which a carbon number is between 5 and 13, or CH$_2$F,

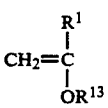 (IV)

wherein,
$R^1$ is either hydrogen or —CH$_3$ group, and $R^{13}$ is either

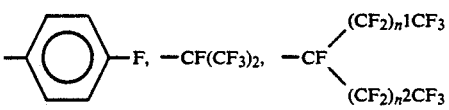

where $n^1$ and $n^2$ are respectively integers in a range between 0 and 10, —CF[CF(CF$_3$)$_2$]$_2$,

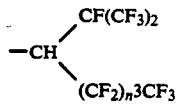

where $n^3$ is an integer in range between 0 and 18,

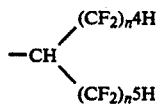

where $n^4$ and $n^5$ are respectively integers in a range between 1 and 18,

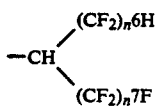

where $n^6$ and $n^7$ are respectively integers in a range between 1 and 18, or

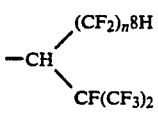

where $n^8$ is an integer in a range between 1 and 18,

wherein, $R^1$ is either hydrogen or —CH$_3$ group, and
$R^{14}$ is either —CH$_2$CF$_2$H, —CH$_2$CF$_2$CH$_3$, —CHCF$_3$, —(CH$_2$)$_3$CF$_3$, or —(CH$_2$CF$_2$H)$_2$.

32. The recording process of claim 25, wherein said base member has a porous member, and said recording member is kept in said porous member so that the recording member is exposed on a surface of the porous member.

33. The recording process of claim 25, wherein said base member has a rough surface, and said recording member is provided on said rough surface of said base member.

34. The recording process of claim 1, wherein said recording medium comprises
a recording film having a characteristic in which a receding contact angle decreases when said recording layer is heated in a condition where said recording layer is in contact with a liquid, said recording layer has an organic compound which includes a hydrophobic group, said hydrophobic group having a nature whereby it is oriented to a side open to air when said recording layer is heated in air.

35. The recording process of claim 1, wherein said recording medium comprises
a recording film having a characteristic in which a receding contact angle decreases when said recording layer is heated in a condition where said recording layer is in contact with a liquid, said recording layer containing a compound which has side chains having alkyl group that has a carbon number of 4 or more.

36. The recording process of claim 1, wherein said recording medium comprises
a recording film having a characteristic in which a receding contact angle decreases when said recording layer is heated in a condition where said recording layer is in contact with a liquid, said recording layer containing a compound which has side chains having fluorine.

37. A recording process comprising in an arbitrary order the following steps (a) and (b) of:
(a) bringing a recording agent which includes a colorant into contact with a surface of a recording medium, said surface having a characteristic in which a receding contact angle decreases when said recording medium is heated in a condition where said recording medium is in contact with a liquid, and
(b) selectively heating said surface of said recording medium in accordance with image information,
wherein on said surface of said recording medium, a visible image of said colorant is formed in an area having the receding contact angle corresponding to a temperature of said recording medium obtained by selectively heating said surface of said recording medium in accordance with image information.

38. A recording process as claimed in claim 37, wherein said step (a) precedes said step (b).

39. A recording process as claimed in claim 37, wherein said step (b) precedes said step (a).

40. A recording process as claimed in claim 37 further comprising steps of removing said recording agent from said surface of said recording medium, and heating said surface of said recording medium, so that said area is eliminated.

41. A recording process as claimed in claim 37 further comprising a step of fixing said visible image developed by said recording agent on said surface of said recording medium, to said surface of said recording medium.

42. A recording process as claimed in claim 37 further comprising steps of transferring said visible image developed by said on said surface of said recording medium to a medium for image transfer and fixing said visible image which is transferred to said surface of said medium for image transfer, on a surface of said medium for image transfer.

* * * * *